(12) United States Patent
Hirosawa

(10) Patent No.: US 11,573,444 B2
(45) Date of Patent: Feb. 7, 2023

(54) DISPLAY DEVICE

(71) Applicant: Japan Display Inc., Tokyo (JP)

(72) Inventor: Jin Hirosawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/574,719

(22) Filed: Jan. 13, 2022

(65) Prior Publication Data

US 2022/0221750 A1    Jul. 14, 2022

(30) Foreign Application Priority Data

Jan. 14, 2021    (JP) ................. 2021-004112

(51) Int. Cl.
*G02F 1/1333*    (2006.01)
*G06V 40/13*    (2022.01)
*G02F 1/1335*    (2006.01)

(52) U.S. Cl.
CPC .... *G02F 1/13338* (2013.01); *G02F 1/133512* (2013.01); *G02F 1/133514* (2013.01); *G06V 40/1318* (2022.01)

(58) Field of Classification Search
None
See application file for complete search history.

(56) References Cited

U.S. PATENT DOCUMENTS

| | | | |
|---|---|---|---|
| 10,914,977 B1 * | 2/2021 | Hsu | ............ G02F 1/13338 |
| 2003/0174870 A1 | 9/2003 | Kim et al. | |
| 2018/0165497 A1 | 6/2018 | Lee et al. | |
| 2018/0247100 A1 * | 8/2018 | Zhu | ............ G06V 40/1318 |
| 2019/0026530 A1 * | 1/2019 | Wu | ............ H01L 27/146 |
| 2020/0348550 A1 * | 11/2020 | Wu | ............ G06V 40/1318 |
| 2021/0110131 A1 * | 4/2021 | Lin | ............ H01L 27/14623 |

FOREIGN PATENT DOCUMENTS

| | | | | |
|---|---|---|---|---|
| CN | 110119046 A | * | 8/2019 | ....... G02F 1/133512 |
| CN | 110161739 A | * | 8/2019 | ......... G02F 1/13338 |
| CN | 110309775 A | * | 10/2019 | ......... G02F 1/13338 |
| CN | 110426891 A | * | 11/2019 | ....... G02F 1/133512 |
| CN | 111965881 A | * | 11/2020 | ......... G02F 1/13338 |
| JP | 3840595 B2 | | 11/2006 | |
| JP | 6479151 B2 | | 3/2019 | |

* cited by examiner

*Primary Examiner* — Shan Liu
(74) *Attorney, Agent, or Firm* — Maier & Maier, PLLC

(57) ABSTRACT

According to one embodiment, a display device includes a first substrate, a second substrate, and a liquid crystal layer, wherein the second substrate includes a first light-shielding member in a frame shape having a first opening overlapping an optical sensor, a light-shielding layer having a second opening overlapping the first opening, and a first pixel opening and a second pixel opening, the first light-shielding member has a first outer edge and a second outer edge elongated in a second direction, the first outer edge overlaps the light-shielding layer between the second opening and the first pixel opening in a planar view, and the second outer edge overlaps the light-shielding layer between the second opening and the second pixel opening in a planar view.

13 Claims, 18 Drawing Sheets

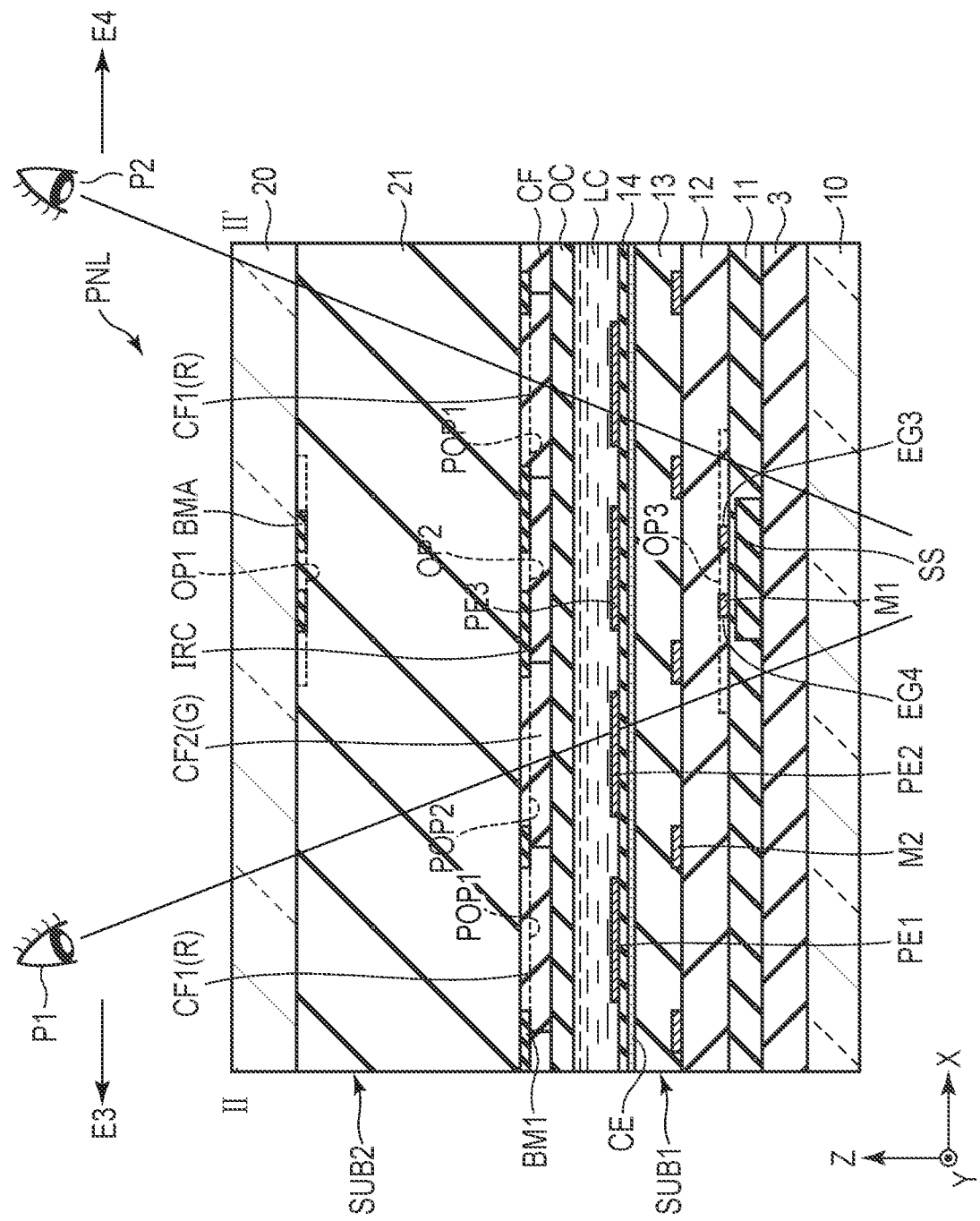
F I G. 8

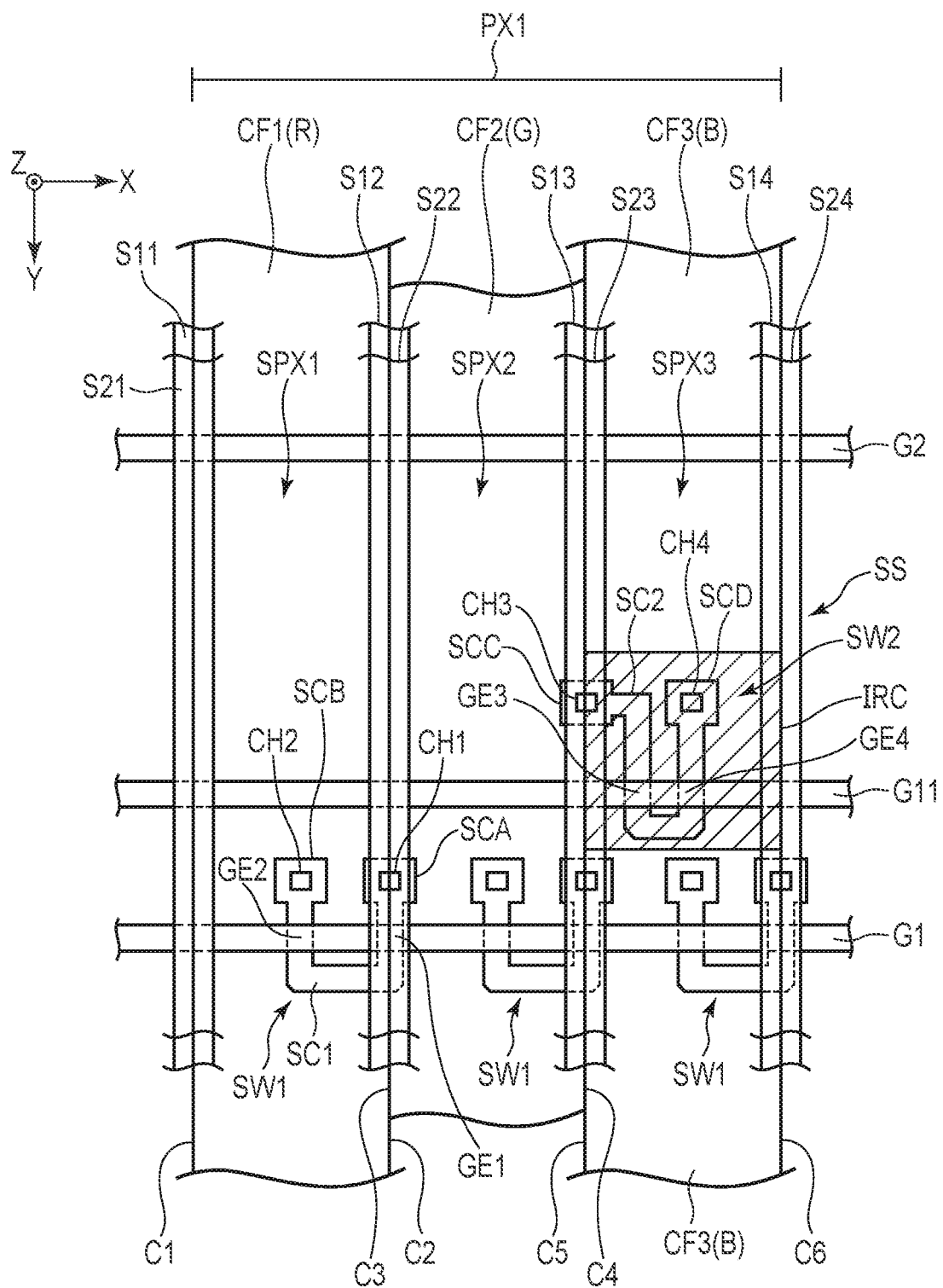
F I G. 17

DISPLAY DEVICE

CROSS-REFERENCE TO RELATED APPLICATIONS

This application is based upon and claims the benefit of priority from Japanese Patent Application No. 2021-004112, filed Jan. 14, 2021, the entire contents of which are incorporated herein by reference.

FIELD

An embodiment of the present invention relates to a display device.

BACKGROUND

In recent years, liquid crystal display devices having a built-in biosensor that detects biometric information, such as a fingerprint sensor and a vein sensor, have been developed. As the biosensor, for example, an optical sensor using a photoelectric conversion element is applied. In order to suppress a degradation in the Modulation Transfer Function (MTF) of the optical sensor, a light-shielding layer as a collimator that blocks obliquely incident light is disposed on the upper layer of the optical sensor. However, since the light-shielding layer also blocks the light that is obliquely transmitted through the pixels located around the optical sensor, there is a risk that the luminance in the oblique field of view may be degraded and the display light in the oblique field of view may be imparted with an undesired color.

BRIEF DESCRIPTION OF THE DRAWINGS

FIG. 8 is a cross-sectional view of the display panel taken along line II-II' shown in FIG. 7.

FIG. 17 is a plan view illustrating pixels.

DETAILED DESCRIPTION

Figure 1:
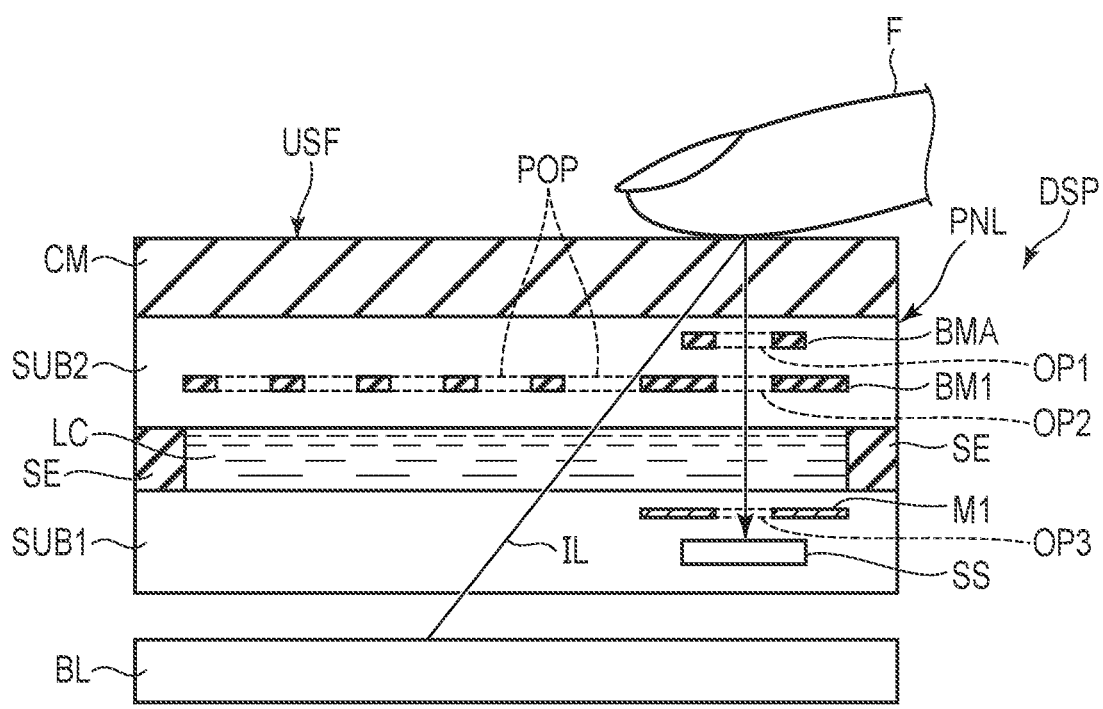
FIG. 1 is a diagram schematically illustrating a display device according to the present embodiment.

In general, according to an embodiment, a display device comprises a first substrate including an optical sensor, a second substrate facing the first substrate, and a liquid crystal layer located between the first substrate and the second substrate, wherein the second substrate includes an insulating substrate, a first light-shielding member in a frame shape located on a side of the liquid crystal layer of the insulating substrate, the first light-shielding member having a first opening overlapping the optical sensor, a transparent organic insulating layer covering the first light-shielding member, a light-shielding layer disposed on a side of the liquid crystal layer of the organic insulating layer, the light-shielding layer having a second opening overlapping the first opening, and a first pixel opening and a second pixel opening, a first color filter disposed in the first pixel opening, and a second color filter disposed in the second pixel opening, the second color filter having a color different from a color of the first color filter, the second opening is located between the first pixel opening and the second pixel opening in a first direction, the first light-shielding member has a first outer edge and a second outer edge elongated in a second direction intersecting the first direction, the first outer edge overlaps the light-shielding layer between the second opening and the first pixel opening in a planar view, and the second outer edge overlaps the light-shielding layer between the second opening and the second pixel opening in a planar view.

According to an embodiment, a display device comprises a first substrate including an optical sensor, a second substrate facing the first substrate, and a liquid crystal layer located between the first substrate and the second substrate, wherein the second substrate includes an insulating substrate, a first light-shielding member in a frame shape located on a side of the liquid crystal layer of the insulating substrate, the first light-shielding member having a first opening overlapping the optical sensor, a second light-shielding member in a strip shape located on a side of the liquid crystal layer of the insulating substrate, a transparent organic insulating layer covering the first light-shielding member and the second light-shielding member, a light-shielding layer disposed on a side of the liquid crystal layer of the organic insulating layer, the light-shielding layer having a second opening overlapping the first opening, and a first pixel opening and a second pixel opening, a first color filter disposed in the first pixel opening, and a second color filter disposed in the second pixel opening, the second color filter having a color different from a color of the first color filter, the first light-shielding member and the second light-shielding member are disposed in a first direction, the second pixel opening is located between the first pixel opening and the second opening in the first direction, and the second light-shielding member is located between the first pixel opening and the second pixel opening in a planar view.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

First, the configuration of the first embodiment will be described with reference to FIGS. 1 to 6.

FIG. 1 is a diagram schematically illustrating a display device DSP according to the present embodiment. The display device DSP of the present embodiment is a liquid crystal display device.

The display device DSP includes a display panel PNL, a cover member CM, and a backlight unit BL.

The display panel PNL is a liquid crystal display panel and includes a first substrate SUB1, a second substrate SUB2 facing the first substrate SUB1, a sealing member SE, and a liquid crystal layer LC located between the first substrate SUB1 and the second substrate SUB2.

The first substrate SUB1 includes an optical sensor SS and a first metal layer M1. The first metal layer M1 is located on the liquid crystal layer LC side from the optical sensor SS. In addition, the second substrate SUB2 includes a first light-shielding member BMA and a light-shielding layer BM1. The light-shielding layer BM1 is located on the liquid crystal layer LC side from the first light-shielding member BMA. The display panel PNL of the present embodiment is a transmissive type having a transmissive display function for displaying an image by selectively transmitting light from the back side of the first substrate SUB1.

The first light-shielding member BMA has a first opening OP1 that overlaps the optical sensor SS. The light-shielding layer BM1 has a second opening OP2 that overlaps the optical sensor SS. The first metal layer M1 has a third opening OP3 that overlaps the optical sensor SS. The first opening OP1, the second opening OP2, and the third opening OP3 are formed at positions at which the openings overlap each other. In addition, the light-shielding layer BM1 has a pixel opening POP at a position at which the pixel opening POP does not overlap the optical sensor SS.

The sealing member SE adheres the first substrate SUB1 to the second substrate SUB2. Between the first substrate SUB1 and the second substrate SUB2, a predetermined cell gap is formed with a spacer (not shown). This cell gap is filled with the liquid crystal layer LC.

The cover member CM is provided on the display panel PNL. The cover member CM is, for example, a glass substrate or a resin substrate. The cover member CM has an upper surface USF with which an object such as a living body comes into contact. The configuration example shown in FIG. 1 shows a state in which a finger F is in contact with the upper surface USF.

The backlight unit BL is provided below the display panel PNL. The backlight unit BL emits illumination light IL toward the upper surface USF.

The optical sensor SS can detect uneven parts (for example, fingerprints) on the surface of the finger F by detecting the illumination light IL reflected off the finger F, for example. In order to obtain a more accurate signal, the optical sensor SS preferably detects incident light parallel to the normal direction of the upper surface USF. The first light-shielding member BMA, the light-shielding layer BM1, and the first metal layer M1 function as a collimator that parallelizes the light incident on the optical sensor SS. That is, the light inclined to the normal direction of the upper surface USF is blocked by the first light-shielding member BMA, the light-shielding layer BM1, and the first metal layer M1. For example, in the illumination light IL, the reflected light reflected off the finger F passes through the first opening OP1, the second opening OP2, and the third opening OP3, and is detected by the optical sensor SS. That is, the reflected light reflected off the finger F passes through the cover member CM, the second substrate SUB2, the liquid crystal layer LC, and the upper layer of the first substrate SUB1 above the optical sensor SS, and is detected by the optical sensor SS.

With the optical sensor SS mounted on the display device DSP as described above, the function as a fingerprint sensor can be added to the display device DSP. In addition, the optical sensor SS can detect information about the living body by detecting the reflected light reflected in the inside of the finger F in addition to detecting the fingerprint. Here, the information about the living body is, for example, a blood vessel image such as a vein, a pulse, a pulse wave, or the like.

Figure 2:
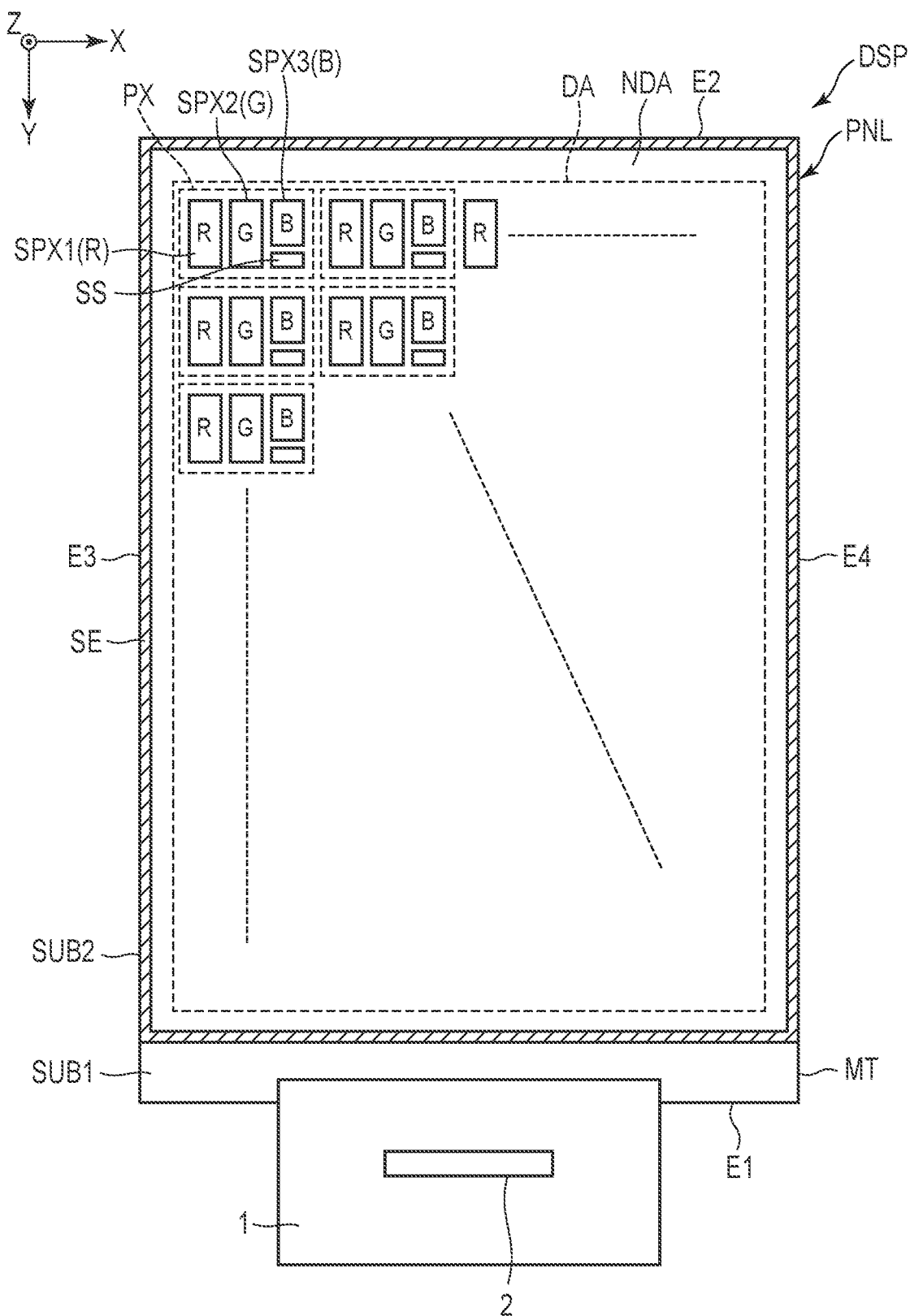
FIG. 2 is a plan view schematically illustrating the display device according to the present embodiment.

FIG. 2 is a plan view schematically illustrating the display device DSP according to the present embodiment.

For example, although a first direction X, a second direction Y, and a third direction Z are orthogonal to each other, these directions may intersect with each other at an angle other than an angle of 90 degrees. The first direction X and the second direction Y correspond to the directions parallel to the main surface of the substrate constituting the display device DSP, and the third direction Z corresponds to the thickness direction of the display device DSP. In the present specification, the direction toward the distal part of the arrow indicating the third direction Z is upward, and the direction opposite from the distal part of the arrow is downward. In addition, it is assumed that there is an observation position for observing the display device DSP on the distal part side of the arrow indicating the third direction Z, and viewing an X-Y plane defined by the first direction X and the second direction Y from the observation position is referred to as a planar view.

The display device DSP includes the display panel PNL described above and a wiring substrate 1 mounted on the display panel PNL. The display panel PNL includes a display area DA on which an image is displayed and a non-display area NDA surrounding the display area DA.

The first substrate SUB1 has a mounting portion MT exposed to the outside of the second substrate SUB2. The sealing member SE is located in the non-display area NDA. In FIG. 2, the area in which the sealing member SE is disposed is indicated by diagonal lines. The display area DA is located on the inner side surrounded by the sealing member SE. The display panel PNL includes a plurality of pixels PX arrayed in a matrix in the first direction X and the second direction Y in the display area DA.

The pixel PX is constituted of a sub-pixel SPX1 that displays red (R), a sub-pixel SPX2 that displays green (G), a sub-pixel SPX3 that displays blue (B), and the optical sensor SS. In the pixel PX, the sub-pixel SPX1, the sub-pixel SPX2, and the sub-pixel SPX3 are arranged in this order in the first direction X. The optical sensor SS is arranged in the second direction Y of the sub-pixel SPX3 and in the first direction X of the sub-pixel SPX2. In the entire display area DA, the plurality of optical sensors SS is arranged in a matrix in the first direction X and the second direction Y. For example, one optical sensor SS is disposed per pixel PX.

In the example illustrated, the display panel PNL is formed in a rectangular shape in a planar view. The display panel PNL has edges E1 and E2 extending in the first direction X and edges E3 and E4 extending in the second direction. In the example illustrated, the edges E1 and E2 are the short sides and the edges E3 and E4 are the long sides.

The wiring substrate 1 is a flexible substrate and is mounted on the mounting portion MT. In addition, the wiring substrate 1 includes a driver IC chip 2 that drives the display panel PNL. Incidentally, the driver IC chip 2 may be mounted on the mounting portion MT.

Figure 3:
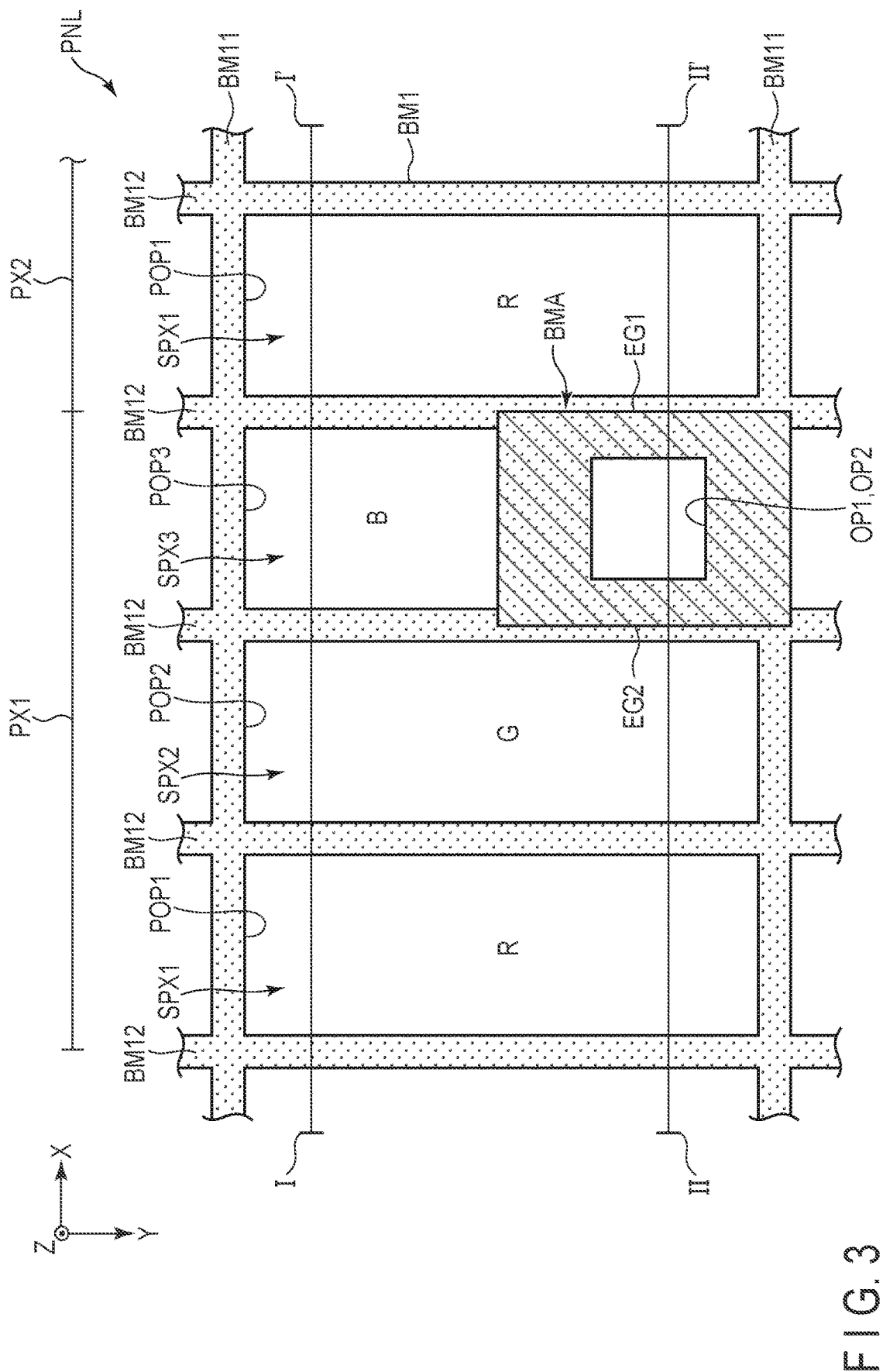
FIG. 3 is a plan view illustrating a first light-shielding member and a light-shielding layer disposed on pixels.

FIG. 3 is a plan view illustrating the first light-shielding member BMA and the light-shielding layer BM1 disposed on the pixel PX1. In FIG. 3, the area in which the first light-shielding member BMA is disposed is indicated by diagonal lines. In the following, the first light-shielding member BMA alone disposed in the pixel PX1 will be illustrated, and the illustration of the first light-shielding member BMA disposed in the pixel adjacent to the pixel PX1 will be omitted. The same applies to the second to fourth light-shielding members described later. In addition, the area in which the light-shielding layer BM1 is disposed is indicated by dots.

The first light-shielding member BMA has the first opening OP1 and is formed in a frame shape. The first light-shielding member BMA overlaps the light-shielding layer BM1. The light-shielding layer BM1 has a plurality of first parts BM11 extending in the first direction X and arranged in the second direction Y, and a plurality of second parts BM12 extending in the second direction Y and arranged in the first direction X. The light-shielding layer BM1 partitions the respective sub-pixels SPX1, SPX2, and SPX3. In addition, the light-shielding layer BM1 has a first pixel opening POP1, a second pixel opening POP2, a third pixel opening POP3, and a second opening OP2. The first pixel opening POP1, the second pixel opening POP2, and the third pixel opening POP3 are surrounded by two adjacent first parts BM11 and two adjacent second parts BM12. In the pixel PX1, the first pixel opening POP1, the second pixel opening POP2, and the third pixel opening POP3 are arranged in the first direction X. In addition, the third pixel opening POP3 is arranged in the second direction Y of the second opening OP2. The second opening OP2 is formed at a position at which the second opening OP2 overlaps the first opening OP1. Incidentally, the pixel PX2 adjacent to the pixel PX1 and the other pixel PX have the same configuration as the pixel PX1.

Here, attention is paid to the second pixel opening POP2 and the second opening OP2 of the pixel PX1 and the first pixel opening POP1 of the pixel PX2. In the first direction X, the second opening OP2 is located between the second pixel opening POP2 of the pixel PX1 and the first pixel opening POP1 of the pixel PX2. The first light-shielding member BMA has an outer edge (first outer edge) EG1 and an outer edge (second outer edge) EG2 elongated in the second direction Y. The outer edge EG1 overlaps the light-shielding layer BM1 between the second opening OP2 and the first pixel opening POP1 of the pixel PX2 in a planar view. The outer edge EG2 overlaps the light-shielding layer BM1 between the second opening OP2 and the second pixel opening POP2 of the pixel PX1 in a planar view.

Figure 4:
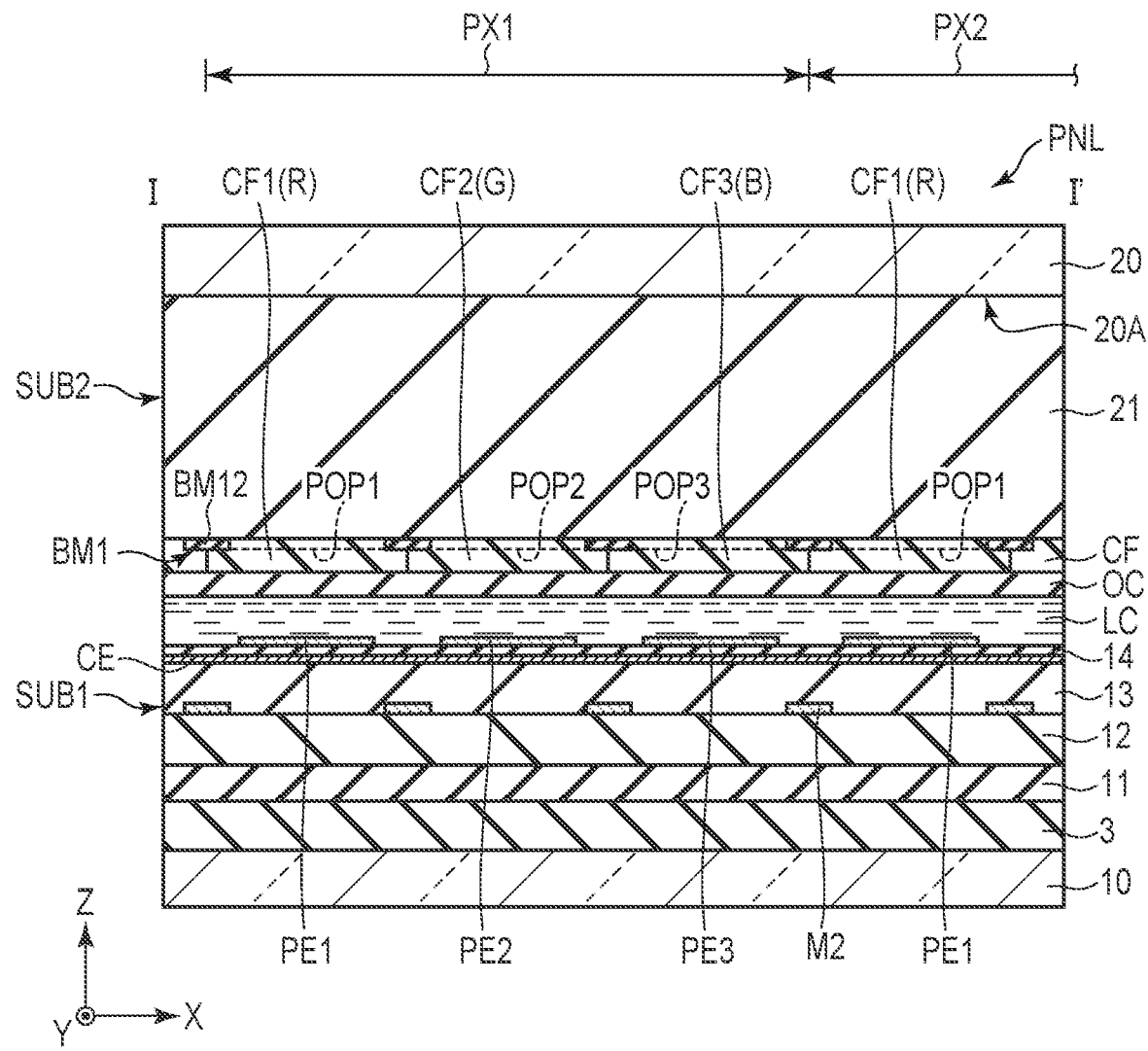
FIG. 4 is a cross-sectional view of a display panel taken along line I-I' shown in FIG. 3.

FIG. 4 is a cross-sectional view of the display panel PNL taken along line I-I' shown in FIG. 3.

The first substrate SUB1 includes an insulating substrate 10, a constituent layer 3, insulating layers 11 to 14, a second metal layer M2, a common electrode CE, pixel electrodes PE1, PE2, PE3, and the like.

The insulating substrate 10 is a transparent substrate such as a glass substrate or a resin substrate. The constituent layer 3 is located on the insulating substrate 10. The constituent layer 3 includes a switching element, an insulating layer, and the like. The detailed configuration of the constituent layer 3 will be described with reference to FIG. 16. The insulating layer 11 covers the constituent layer 3. The insulating layer 12 covers the insulating layer 11. The second metal layer M2 is located on the insulating layer 12. The insulating layer 13 covers the second metal layer M2 and the insulating layer 12. The common electrode CE is located on the insulating layer 13. The insulating layer 14 covers the common electrode CE. The pixel electrodes PE1, PE2, and PE3 are located on the insulating layer 14. The pixel electrodes PE1, PE2, PE3, and the insulating layer 14 are covered with an alignment film (not shown).

The second substrate SUB2 includes an insulating substrate 20, a transparent organic insulating layer 21, the light-shielding layer BM1, a color filter layer CF, an overcoat layer OC, and the like.

The insulating substrate 20 is a transparent substrate such as a glass substrate or a resin substrate. The insulating substrate 20 has a surface 20A on the liquid crystal layer LC side. The organic insulating layer 21 is disposed on the liquid crystal layer LC side of the insulating substrate 20 and covers the surface 20A. The light-shielding layer BM1 and the color filter layer CF are disposed on the liquid crystal layer LC side of the organic insulating layer 21. The light-shielding layer BM1 overlaps the second metal layer M2. The light-shielding layer BM1 is formed of, for example, a black-colored resin.

The color filter layer CF includes a first color filter CF1, a second color filter CF2, and a third color filter CF3 arranged in the first direction X. The colors of the first color filter CF1, the second color filter CF2, and the third color filter CF3 are different from each other. The first color filter CF1 is disposed in the first pixel opening POP1. The second color filter CF2 is disposed in the second pixel opening POP2. The third color filter CF3 is disposed in the third pixel opening POP3. The end parts of the first color filter CF1, the second color filter CF2, and the third color filter CF3 overlap the second part BM12 of the light-shielding layer BM1. In addition, the first color filter CF1 overlaps the pixel electrode PE1, the second color filter CF2 overlaps the pixel electrode PE2, and the third color filter CF3 overlaps the pixel electrode PE3.

The overcoat layer OC covers the color filter layer CF. The overcoat layer OC is covered with an alignment film (not shown).

The insulating layers 11 and 14 are formed of a transparent inorganic insulating material, for example, including silicon oxide, silicon nitride, or silicon oxynitride. The insulating layers 12, 13 and 21 are formed of a transparent organic insulating material. The pixel electrodes PE1, PE2, PE3 and the common electrode CE are formed of a transparent conductive material, for example, including indium tin oxide (ITO) or indium zinc oxide (IZO).

Incidentally, the second metal layer M2 overlaps the end parts of the first color filter CF1, the second color filter CF2, and the third color filter CF3. As a result, when observing the display panel PNL from a certain angle or more to the third direction Z, it is possible to suppress the occurrence of a color mixing phenomenon in which the light transmitted through the color filter of the turned-on pixel and the adjacent pixel is mixed.

Figure 5:
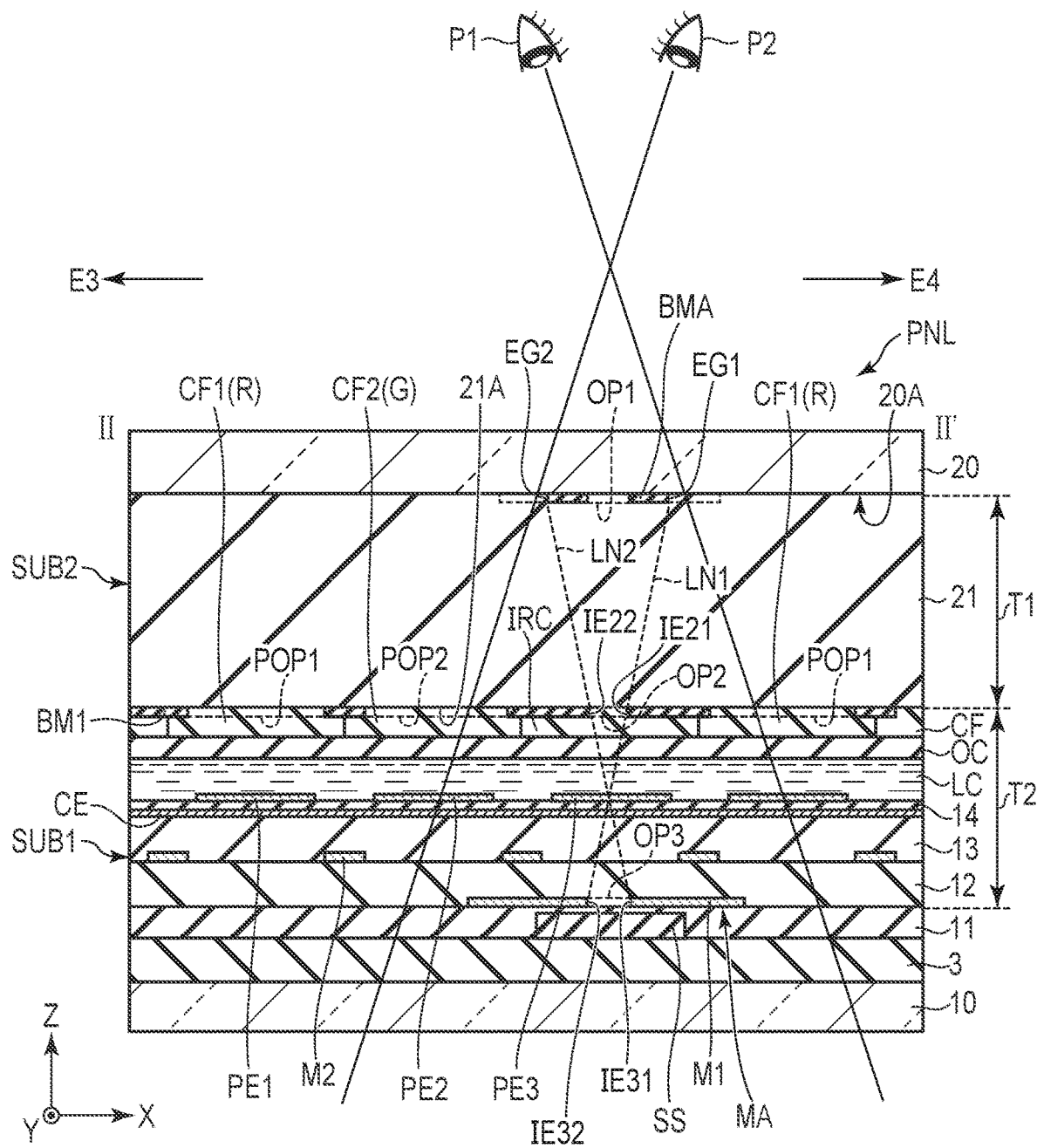
FIG. 5 is a cross-sectional view of the display panel taken along line II-II' shown in FIG. 3.

FIG. 5 is a cross-sectional view of the display panel PNL taken along line II-II' shown in FIG. 3.

The optical sensor SS is disposed on the constituent layer 3 and covered with the insulating layer 11. The first metal layer M1 is disposed on the insulating layer 11 and is covered with the insulating layer 12. The second metal layer M2 is located between the first metal layer M1 and the liquid crystal layer LC.

The color filter layer CF has an infrared cut layer IRC that overlaps the optical sensor SS. The infrared cut layer IRC is disposed in the second opening OP2. The infrared cut layer IRC blocks infrared rays that cause noise to the optical sensor SS when the display device DSP is used in solar light. The infrared cut layer IRC is arranged on the optical sensor SS, it is possible to suppress the occurrence of malfunction of the optical sensor SS due to light that becomes noise.

Incidentally, in FIG. 4, the pixel electrode PE3 which overlaps the blue third color filter CF3 also overlaps the infrared cut layer IRC as shown in FIG. 5.

The first light-shielding member BMA is located on the liquid crystal layer LC side of the insulating substrate 20. In the example illustrated, the first light-shielding member MBA is located on the surface 20A. The first light-shielding member BMA is formed of, for example, a black-colored resin. The outer edge EG1 and the outer edge EG2 of the first light-shielding member BMA overlap the infrared cut layer IRC. The outer edge EG1 does not overlap the first color filter CF1, and the outer edge EG2 does not overlap the second color filter CF2. The organic insulating layer 21 covers the first light-shielding member BMA. The organic insulating layer 21 is interposed between the first light-shielding member BMA and the light-shielding layer BM1.

The organic insulating layer 21 has a first thickness T1. The display panel PNL has a second thickness T2 between a lower surface MA of the first metal layer M1 and a lower surface 21A of the organic insulating layer 21. The first thickness T1 is greater than the second thickness T2.

Next, the effects that can be obtained by the present embodiment will be described.

First, it is assumed that the first light-shielding member BMA is formed up to the position of the dotted line around the first light-shielding member BMA shown in FIG. 5. In addition, the observation position when observing the display panel PNL diagonally from the edge E3 side of the display panel PNL shown in FIG. 2 is set as an observation point P1, and the observation position when observing the display panel PNL diagonally from the edge E4 side of the display panel PNL shown in FIG. 2 is set as an observation point P2.

In the case in which the display panel PNL is observed from the observation point P1, the light transmitted through the red (R) first color filter CF1 is blocked by the first light-shielding member BMA. As a result, there is a risk that the display light observed from the observation point P1 may be imparted with a color coming close to the wavelength of cyan, for example. In addition, in the case in which the display panel PNL is observed from the observation point P2, the light transmitted through the green (G) second color filter CF2 is blocked by the first light-shielding member BMA. As a result, there is a risk that the display light observed from the observation point P2 may be imparted with a color coming close to the wavelength of purple, for example.

Specifically, as the first thickness T1 of the organic insulating layer 21 is larger, the light to the oblique field of view is more likely to be blocked by the first light-shielding member BMA, and coloring due to such a viewing angle is likely to occur.

According to the present embodiment, the outer edge EG1 of the first light-shielding member BMA is located between the second opening OP2 and the first pixel opening POP1, and the outer edge EG2 of the first light-shielding member BMA is located between the second opening OP2 and the second pixel opening POP2. For this reason, the light to the oblique field of view is not blocked by the first light-shielding member BMA, and it is possible to suppress the occurrence of undesired coloring of the display light. In addition, the above problem can be solved without reducing the first thickness T1 of the organic insulating layer 21.

Next, the positions of the outer edges EG1 and EG2 are specified in more detail.

The first metal layer M1 has inner edges IE31 and IE32 facing the third opening OP3. The inner edge IE31 is located on the edge E4 side, and the inner edge IE32 is located on the edge E3 side. In addition, the light-shielding layer BM1 has inner edges IE21 and IE22 facing the second opening OP2. The inner edge IE21 is located on the edge E4 side, and the inner edge IE22 is located on the edge E3 side. The inner edges IE21, IE22, IE31, and IE32 extend in the second direction Y (see FIG. 6). If the line connecting the inner edge IE32 and the inner edge IE21 is a line LN1, the outer edge EG1 can be brought close to the first opening OP1 to a position at which the outer edge EG1 intersects the line LN1. Similarly, if the line connecting the inner edge IE31 and the inner edge IE22 is a line LN2, the outer edge EG2 can be brought close to the first opening OP1 to a position at which the outer edge EG2 intersects the line LN2. By defining the positions of the outer edges EG1 and EG2 in this way, it is possible to suppress the occurrence of light entering the optical sensor SS from the outside of the first light-shielding member BMA.

Incidentally, in the example shown in FIG. 5, the outer edge EG1 is located on the line LN1 and the outer edge EG2 is located on the line LN2.

Figure 6:
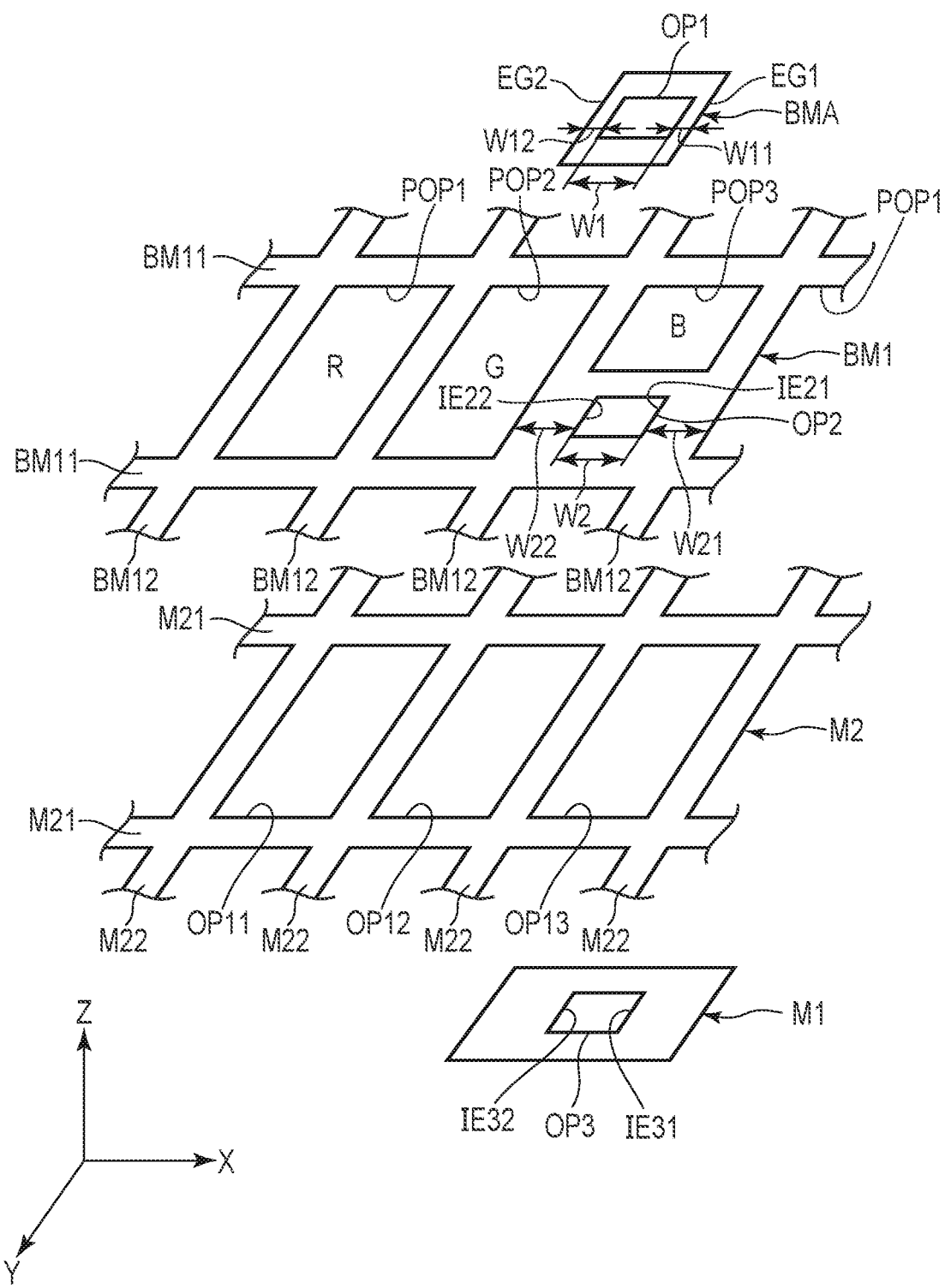
FIG. 6 is a perspective view illustrating the relationship between the first light-shielding member, the light-shielding layer, a first metal layer, and a second metal layer according to a first embodiment.

FIG. 6 is a perspective view illustrating the relationship between the first light-shielding member BMA, the light-shielding layer BM1, the first metal layer M1, and the second metal layer M2 according to the first embodiment.

The first opening OP1 has a width W1 along the first direction X. The second opening OP2 has a width W2 along the first direction X. For example, the width W1 and the width W2 are equivalent.

The first light-shielding member BMA has a width W11 between the first opening OP1 and the outer edge EG1 and a width W12 between the first opening OP1 and the outer edge EG2. The light-shielding layer BM1 has a width W21 between the second opening OP2 and the first pixel opening POP1 and a width W22 between the second opening OP2 and the second pixel opening POP2. The width W11 is smaller than the width W21. In addition, the width W12 is smaller than the width W22.

The first metal layer M1 is formed in a frame shape. The second metal layer M2 includes a plurality of first parts M21 extending in the first direction X and arranged in the second direction Y, and a plurality of second parts M22 extending in the second direction Y and arranged in the first direction X. The first part M21 overlaps the first part BM11 of the light-shielding layer BM1, and the second part M22 overlaps the second part BM12 of the light-shielding layer BM1. In addition, the second metal layer M2 has pluralities of openings OP11, OP12, and OP13 partitioned by the first part M21 and the second part M22. The opening OP11 overlaps the first pixel opening POP1. The opening OP12 overlaps the second pixel opening POP2. The opening (fourth opening) OP13 overlaps the third pixel opening POP3 and the second opening OP2. The opening OP13 also overlaps the first opening OP1 of the first light-shielding member BMA and the third opening OP3 of the first metal layer M1. The opening OP13 is located between the second opening OP2 and the third opening OP3.

Second Embodiment

Next, the configuration of a second embodiment will be described with reference to FIGS. 7 to 9. The second embodiment is different from the first embodiment in that the width of a first metal layer M1 in the first direction X is smaller.

Figure 7:
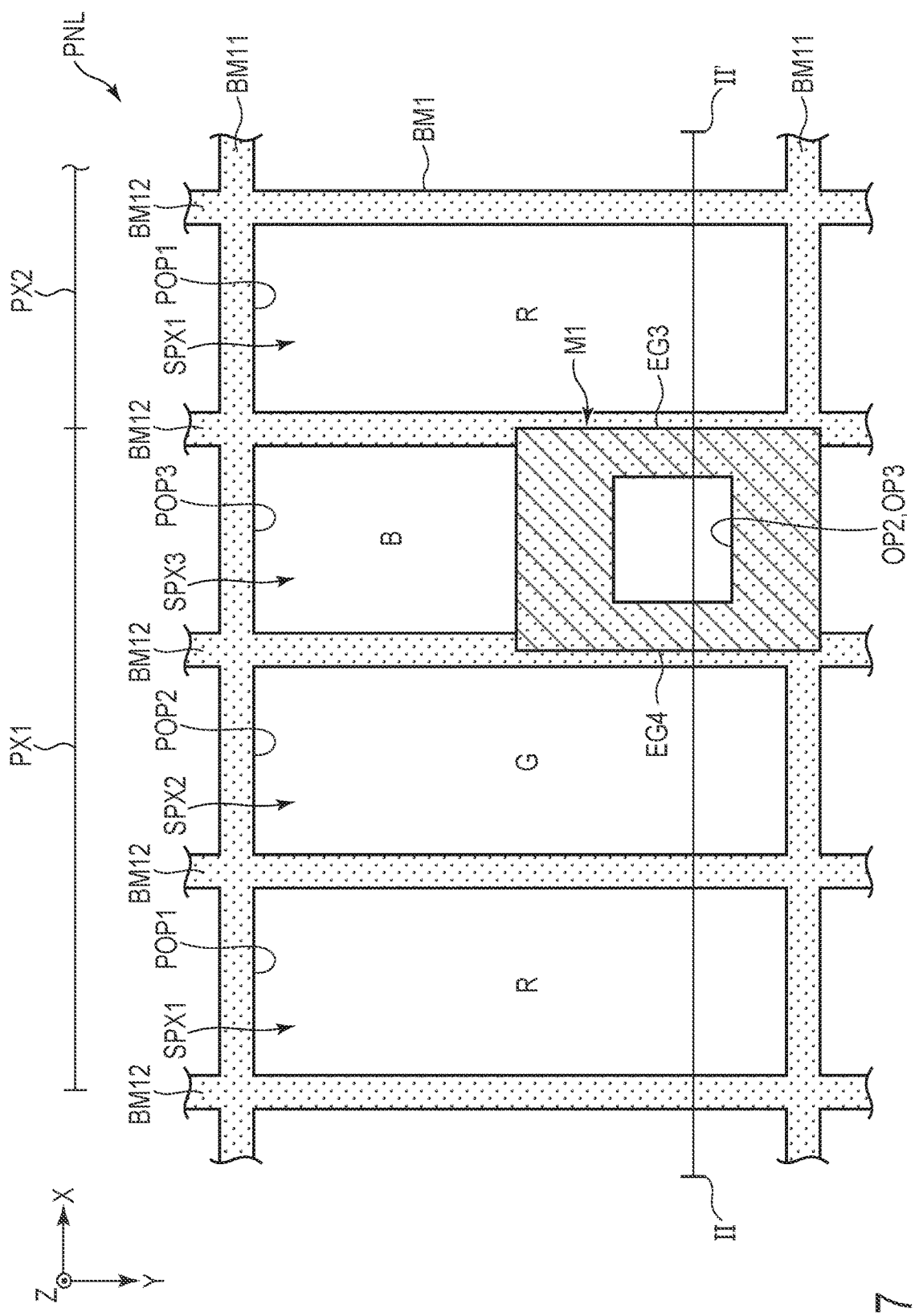
FIG. 7 is a plan view illustrating the first metal layer and the light-shielding layer disposed on the pixels.

FIG. 7 is a plan view illustrating the first metal layer M1 and a light-shielding layer BM1 disposed on a pixel PX1. In FIG. 7, an area in which the first metal layer M1 is disposed is indicated by diagonal lines. The first metal layer M1 overlaps the light-shielding layer BM1.

Here, attention is paid to the second pixel opening POP2 and the second opening OP2 of the pixel PX1 and the first pixel opening POP1 of the pixel PX2. In the first direction X, the second opening OP2 is located between the second pixel opening POP2 of the pixel PX1 and the first pixel opening POP1 of the pixel PX2. The first metal layer M1 has an outer edge (third outer edge) EG3 and an outer edge (fourth outer edge) EG4 elongated in the second direction Y. The outer edge EG3 overlaps the light-shielding layer BM1 between the second opening OP2 and the first pixel opening POP1 of the pixel PX2 in a planar view. The outer edge EG4 overlaps the light-shielding layer BM1 between the second opening OP2 and the second pixel opening POP2 of the pixel PX1 in a planar view.

FIG. 8 is a cross-sectional view of a display panel PNL taken along line II-II' shown in FIG. 7.

The outer edge EG3 and outer edge EG4 of the first metal layer M1 overlap an infrared cut layer IRC. The outer edge EG3 does not overlap the first color filter CF1, and the outer edge EG4 does not overlap the second color filter CF2.

Next, the effects that can be obtained by the present embodiment will be described.

First, it is assumed that the first metal layer M1 is formed up to the position of the dotted line around the first metal layer M1 shown in FIG. 8.

In the case in which the display panel PNL is observed from the observation point P1, the light transmitted through the green (G) second color filter CF2 is blocked by the first metal layer M1. As a result, there is a risk that the display light observed from the observation point P1 may be imparted with a color coming close to the wavelength of purple, for example. In addition, in the case in which the display panel PNL is observed from the observation point P2, the light transmitted through the red (R) first color filter CF1 is blocked by the first metal layer M1. As a result, there is a risk that the display light observed from the observation point P2 may be imparted with a color coming close to the wavelength of cyan, for example.

According to the second embodiment, the outer edge EG3 of the first metal layer M1 is located between the second opening OP2 and the first pixel opening POP1, and the outer edge EG4 of the first metal layer M1 is located between the second opening OP2 and the second pixel opening POP2. For this reason, the light to the oblique field of view is not blocked by the first metal layer M1, and it is possible to suppress the occurrence of undesired coloring of the display light.

Figure 9:
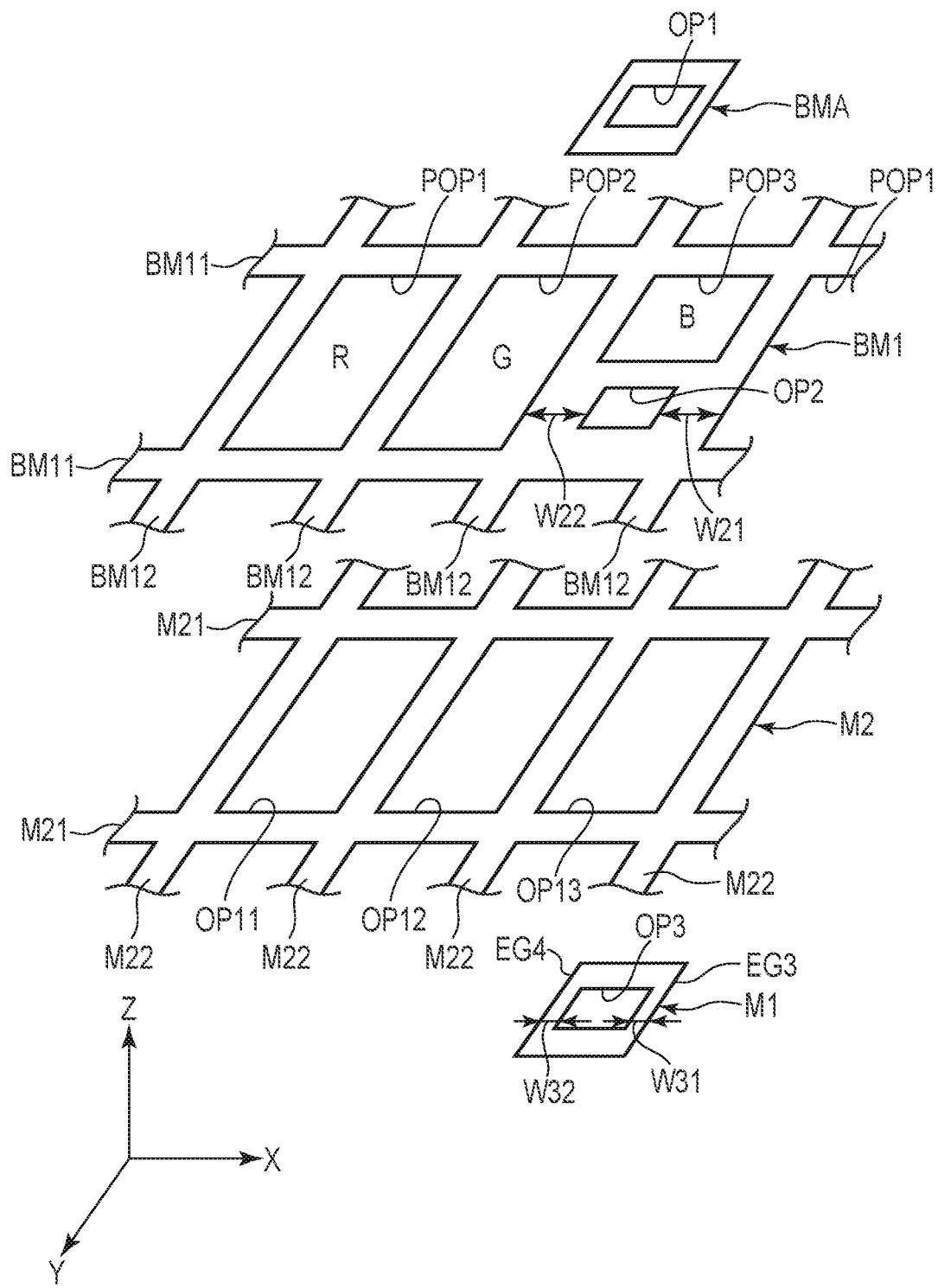
FIG. 9 is a perspective view illustrating the relationship between a first light-shielding member, a light-shielding layer, a first metal layer, and a second metal layer according to a second embodiment.

FIG. 9 is a perspective view illustrating the relationship between a first light-shielding member BMA, the light-shielding layer BM1, the first metal layer M1, and the second metal layer M2 according to the second embodiment. The configurations of the first light-shielding member BMA, the light-shielding layer BM1, and the second metal layer M2 shown in FIG. 9 are the same as those shown in FIG. 6.

The first metal layer M1 has a width W31 between a third opening OP3 and the outer edge EG3 and a width W32 between the third opening OP3 and the outer edge EG4. The light-shielding layer BM1 has a width W21 and a width W22 as shown in FIG. 6. The width W31 is smaller than the width W21. In addition, the width W32 is smaller than the width W22.

Third Embodiment

Next, the configuration of a third embodiment will be described with reference to FIGS. 10 to 12. The third embodiment is different from the first embodiment in a second light-shielding member BMB is included.

Figure 10:
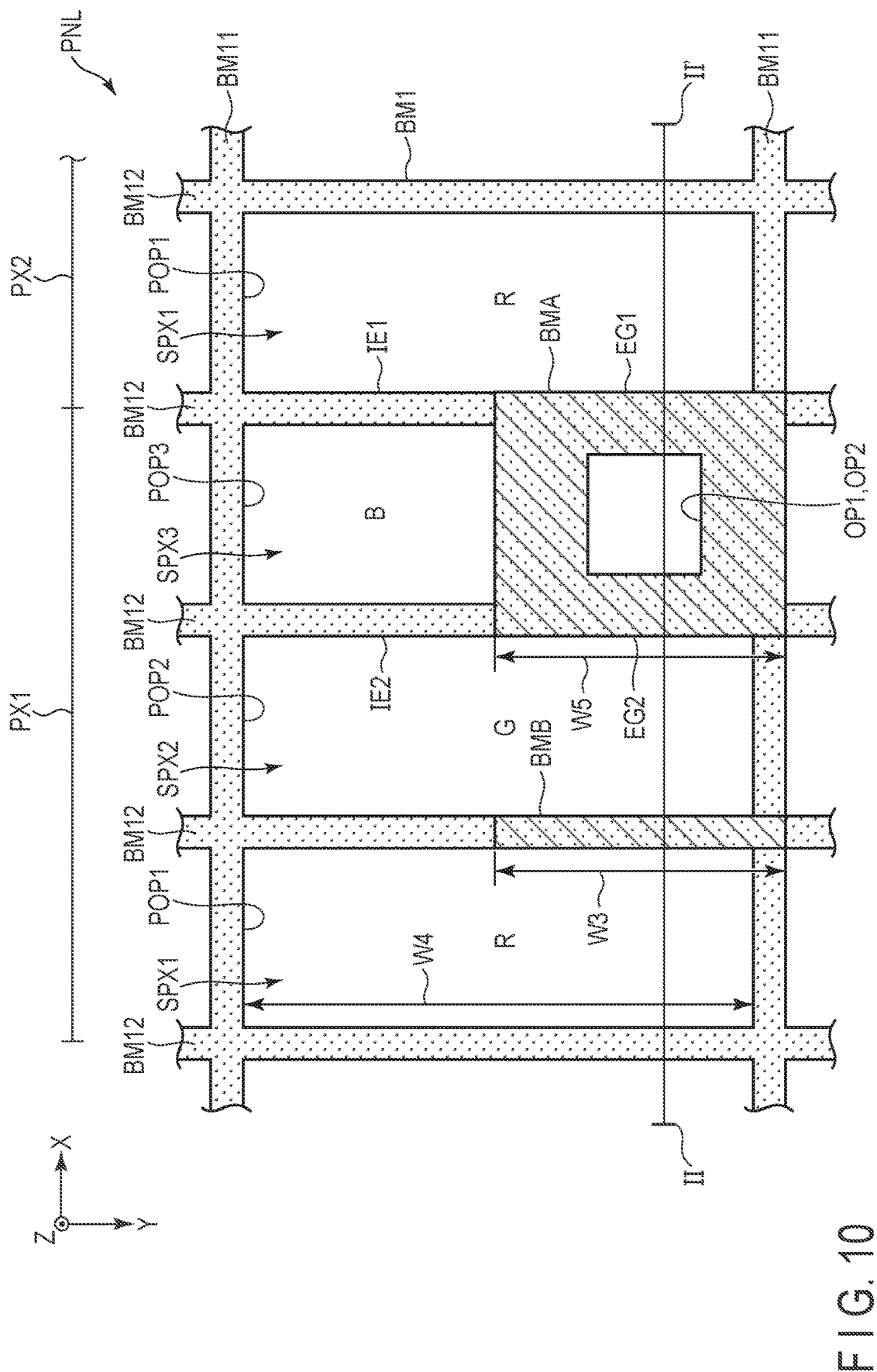
FIG. 10 is a plan view illustrating the first light-shielding member, the second light-shielding member, and the light-shielding layer disposed on pixels.

FIG. 10 is a plan view illustrating a first light-shielding member BMA, the second light-shielding member BMB, and a light-shielding layer BM1 disposed on a pixel PX1. In FIG. 10, the area in which the first light-shielding member BMA and the second light-shielding member BMB are disposed is indicated by diagonal lines.

A display panel PNL includes the second light-shielding member BMB in a strip shape elongated in the second direction Y. The second light-shielding member BMB overlaps the light-shielding layer BM1. The first light-shielding member BMA and the second light-shielding member BMB are arranged in the first direction X.

Here, attention is paid to a first pixel opening POP1, a second pixel opening POP2, and a second opening OP2 of the pixel PX1. In the first direction X, the second pixel opening POP2 is located between the first pixel opening POP1 and the second opening OP2. The second light-shielding member BMB is located between the first pixel opening POP1 and the second pixel opening POP2 in a planar view.

A width W3 of the second light-shielding member BMB in the second direction Y is smaller than a width W4 of the first pixel opening POP1 in the second direction Y. For example, the width W3 is about a half of the width W4. In addition, for example, the width W3 is equal to a width W5 of the first light-shielding member BMA in the second direction Y. Incidentally, the example of the width W3 is not limited to this, and may be larger or smaller than a half of the width W4, or larger or smaller than the width W5.

In the first light-shielding member BMA of the third embodiment, the width in the first direction X is not formed smaller than the width in the first and second embodiments. The light-shielding layer BM1 has an inner edge IE1 facing the first pixel opening POP1 of the pixel PX2 and an inner edge IE2 facing the second pixel opening POP2 of the pixel PX1. The inner edge IE1 is located on the second opening OP2 side to the first pixel opening POP1. The inner edge IE2 is located on the second opening OP2 side to the second pixel opening POP2. The inner edges IE1 and IE2 extend in the second direction Y. For example, an outer edge EG1 of the first light-shielding member BMA overlaps the inner edge IE1. For example, an outer edge EG2 of the first light-shielding member BMA overlaps the inner edge IE2.

Figure 11:
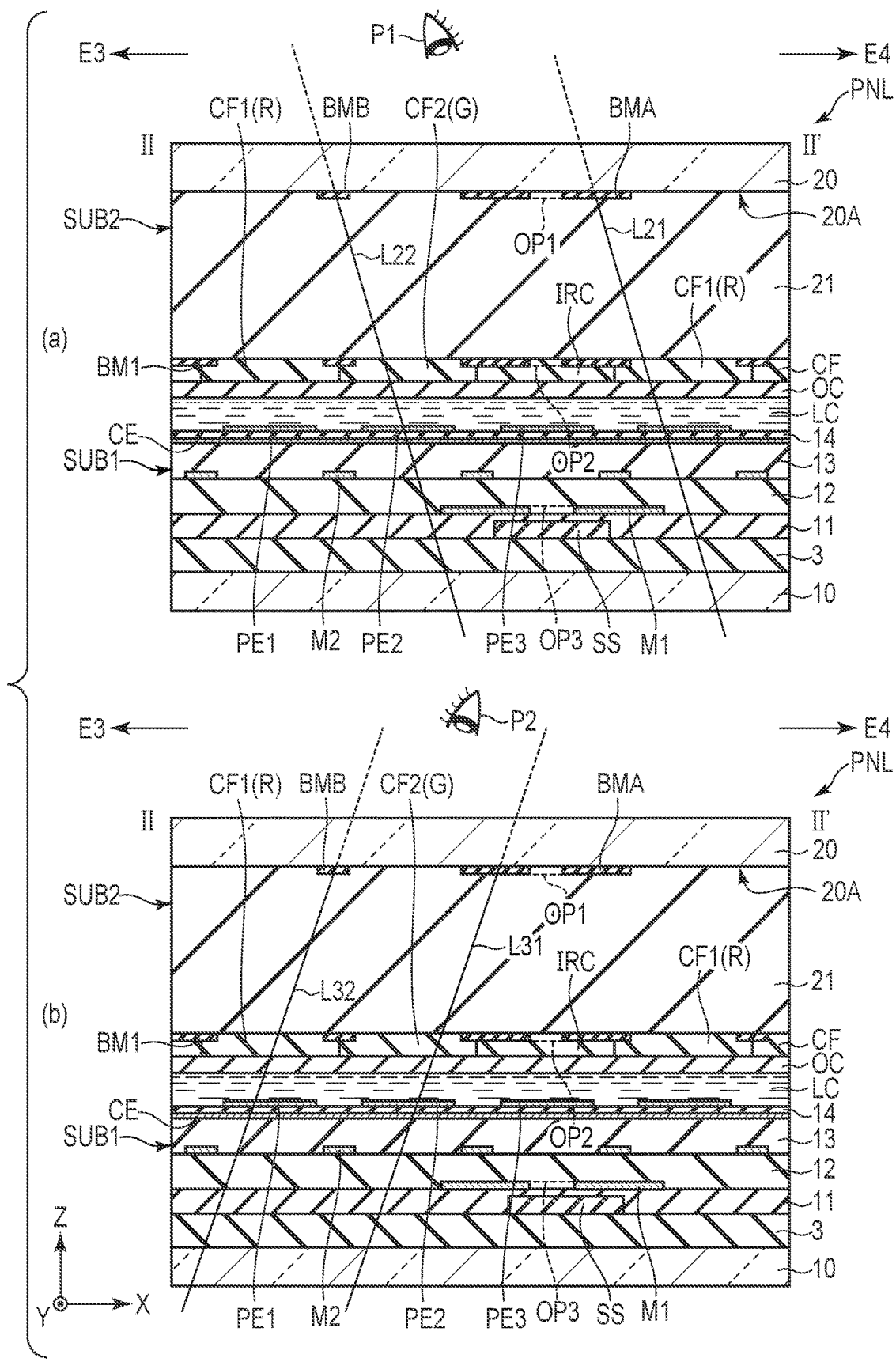
FIG. 11 is cross-sectional view of a display panel taken along line II-II' shown in FIG. 10.

(a) and (b) of FIG. 11 are cross-sectional views of the display panel PNL taken along line II-II' shown in FIG. 10. (a) of FIG. 11 shows the case in which the display panel PNL is observed from an observation point P1. (b) of FIG. 11 shows the case in which the display panel PNL is observed from the observation point P2.

A second substrate SUB2 includes the second light-shielding member BMB. The second light-shielding member BMB is located on the liquid crystal layer LC side of an insulating substrate 20. In the example illustrated, the second light-shielding member BMB is located on a surface 20A. The second light-shielding member BMB is formed of the same material as the material of the first light-shielding member BMA, and is formed of, for example, a resin colored in black. An organic insulating layer 21 covers the first light-shielding member BMA and the second light-shielding member BMB.

Next, the effects that can be obtained by the present embodiment will be described.

as shown in (a) of FIG. 11, when observing the display panel PNL from the observation point P1, light L21 transmitted through a red (R) first color filter CF1 is blocked by the first light-shielding member BMA. As a result, there is a risk that the display light observed from the observation point P1 may be imparted with a color coming close to the wavelength of cyan, for example.

According to the third embodiment, the second light-shielding member BMB overlaps between the first color filter CF1 and a second color filter CF2. For this reason, when observing the display panel PNL from the observation point P1, light L22 that passes through the green (G) second color filter CF2 is also blocked by the second light-shielding member BMB. The green light L22 as well as the red light L21 are reduced, and thus it is possible to adjust the balance of the display colors. Accordingly, it is possible to reduce the coloring of the display light.

As shown in (b) of FIG. 11, when observing the display panel PNL from the observation point P2, light L31 transmitted through the green (G) second color filter CF2 is blocked by the first light-shielding member BMA. As a result, there is a risk that the display light observed from the observation point P2 may be imparted with a color coming close to the wavelength of purple, for example.

According to the third embodiment, when observing the display panel PNL from the observation point P2, light L32 transmitted through the red (R) first color filter CF1 is blocked by the second light-shielding member BMB. The red light L32 as well as the green light L31 are reduced, and thus it is possible to adjust the balance of display colors. Accordingly, it is possible to reduce the coloring of the display light.

Figure 12:
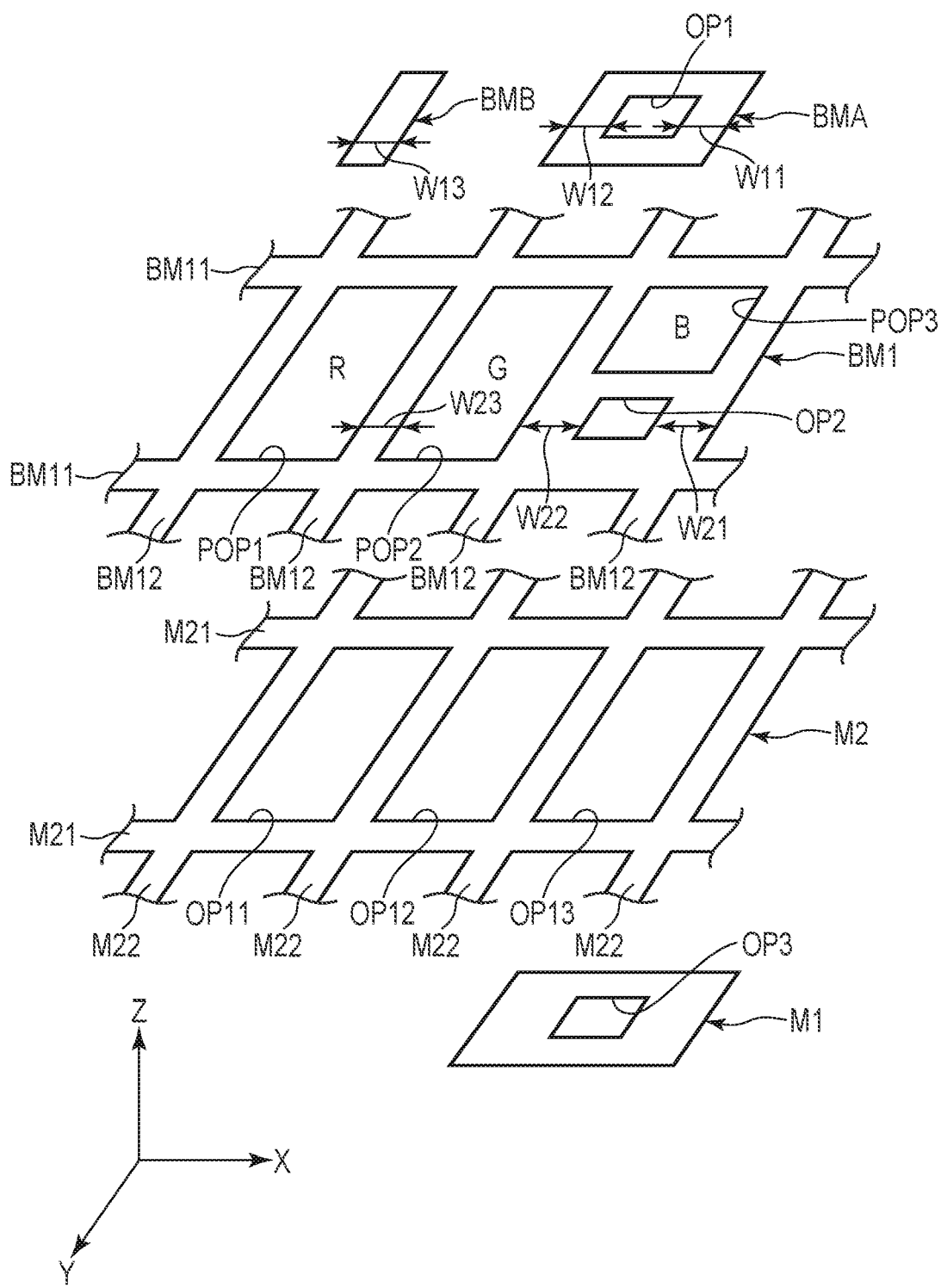
FIG. 12 is a perspective view illustrating the relationship between a first light-shielding member, a second light-shielding member, a light-shielding layer, a first metal layer, and a second metal layer according to a third embodiment.

FIG. 12 is a perspective view illustrating the relationship between the first light-shielding member BMA, the second light-shielding member BMB, the light-shielding layer BM1, a first metal layer M1, and a second metal layer M2 according to the third embodiment. The configurations of the light-shielding layer BM1, the first metal layer M1, and the second metal layer M2 shown in FIG. 12 are the same as those shown in FIG. 6.

The first light-shielding member BMA has a width W11 and a width W12 as shown in FIG. 6. The light-shielding layer BM1 has a width W21 and a width W22 as shown in FIG. 6. In the third embodiment, for example, the width W11 is equal to the width W21 and the width W12 is equal to the width W22. In addition, the second light-shielding member BMB has a width W13 in the first direction X. A second part BM12 between the first pixel opening POP1 and the second pixel opening POP2 has a width W23 in the first direction X. For example, the width W13 is equal to the width W23.

Fourth Embodiment

Next, the configuration of a fourth embodiment will be described with reference to FIGS. 13 to 15. The fourth embodiment is different from the third embodiment in that the position of a third pixel opening POP3 is shifted in the second direction Y to a first pixel opening POP1 and a second pixel opening POP2.

Figure 13:
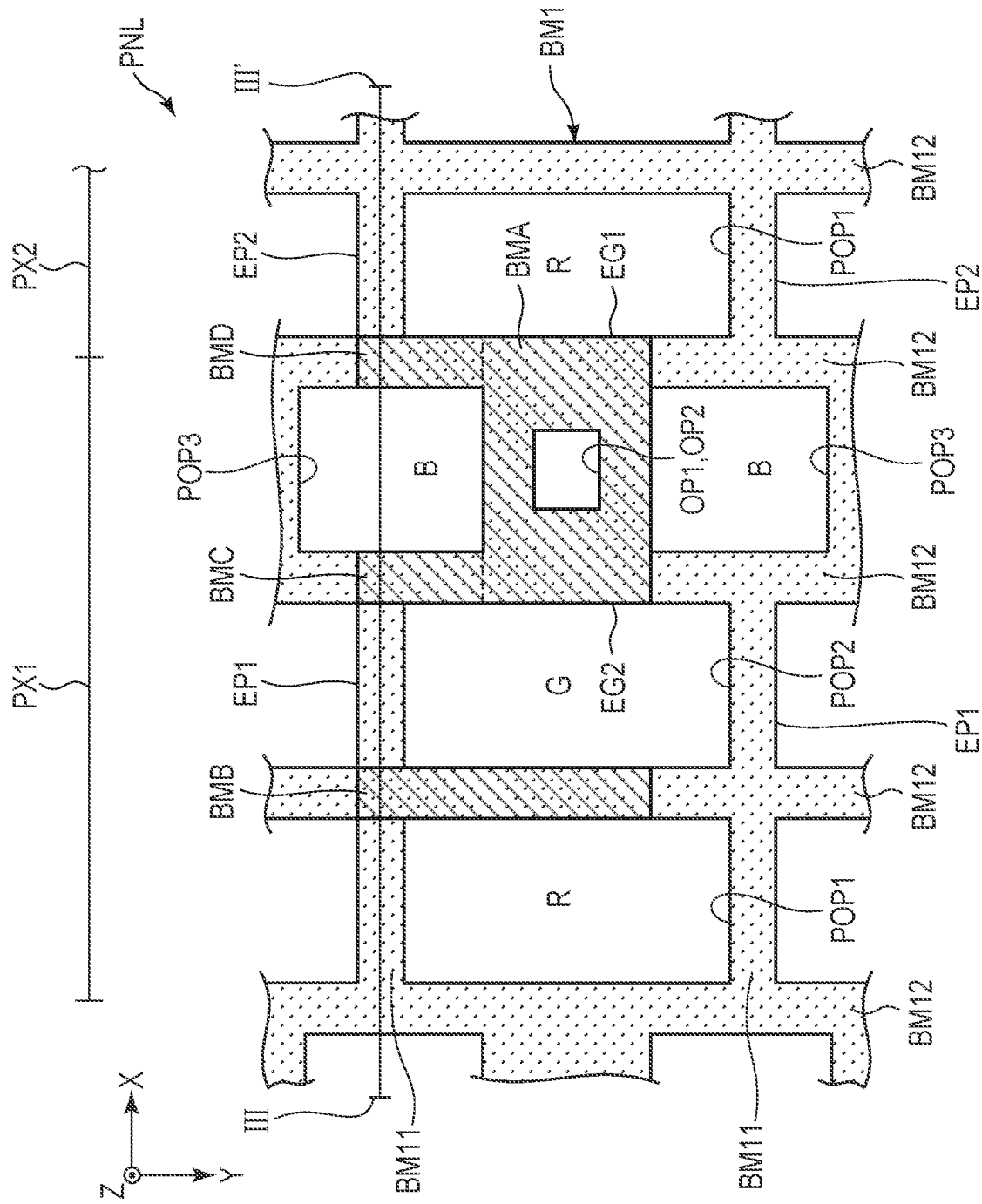
FIG. 13 is a plan view illustrating the first light-shielding member, the second light-shielding member, a third light-shielding member, a fourth light-shielding member, and the light-shielding layer disposed on pixels.

FIG. 13 is a plan view illustrating a first light-shielding member BMA, a second light-shielding member BMB, a third light-shielding member BMC, a fourth light-shielding member BMD, and a light-shielding layer BM1 disposed on a pixel PX1. In FIG. 13, the areas in which the first light-shielding member BMA, the second light-shielding member BMB, the third light-shielding member BMC, and the fourth light-shielding member BMD are disposed are indicated by diagonal lines.

A first part BM11 of the light-shielding layer BM1 has a first extended portion EP1 and a second extended portion EP2 elongated in the first direction X. The first extended portion EP1, the third pixel opening POP3, and the second extended portion EP2 are arranged in the first direction X.

The display panel PNL includes the third light-shielding member BMC and the fourth light-shielding member BMD in a strip shape elongated in the second direction Y. The third light-shielding member BMC and the fourth light-shielding member BMD overlap the light-shielding layer BM1. A part of the third light-shielding member BMC is located between the second pixel opening POP2 and the third pixel opening POP3 in a planar view, and the other part overlaps the first extended portion EP1. A part of the fourth light-shielding member BMD is located between the third pixel opening POP3 and the first pixel opening POP1 of the pixel PX2 in a planar view, and the other part overlaps the second extended portion EP2. The second light-shielding member BMB, the third light-shielding member BMC, and the fourth light-shielding member BMD are arranged in this order in the first direction X. The third light-shielding member BMC and the fourth light-shielding member BMD are arranged in the second direction Y of the first light-shielding member BMA. In the example illustrated, the third light-shielding member BMC and the fourth light-shielding member BMD are connected to the first light-shielding member BMA, but may be separated from the first light-shielding member BMA.

Figure 14:
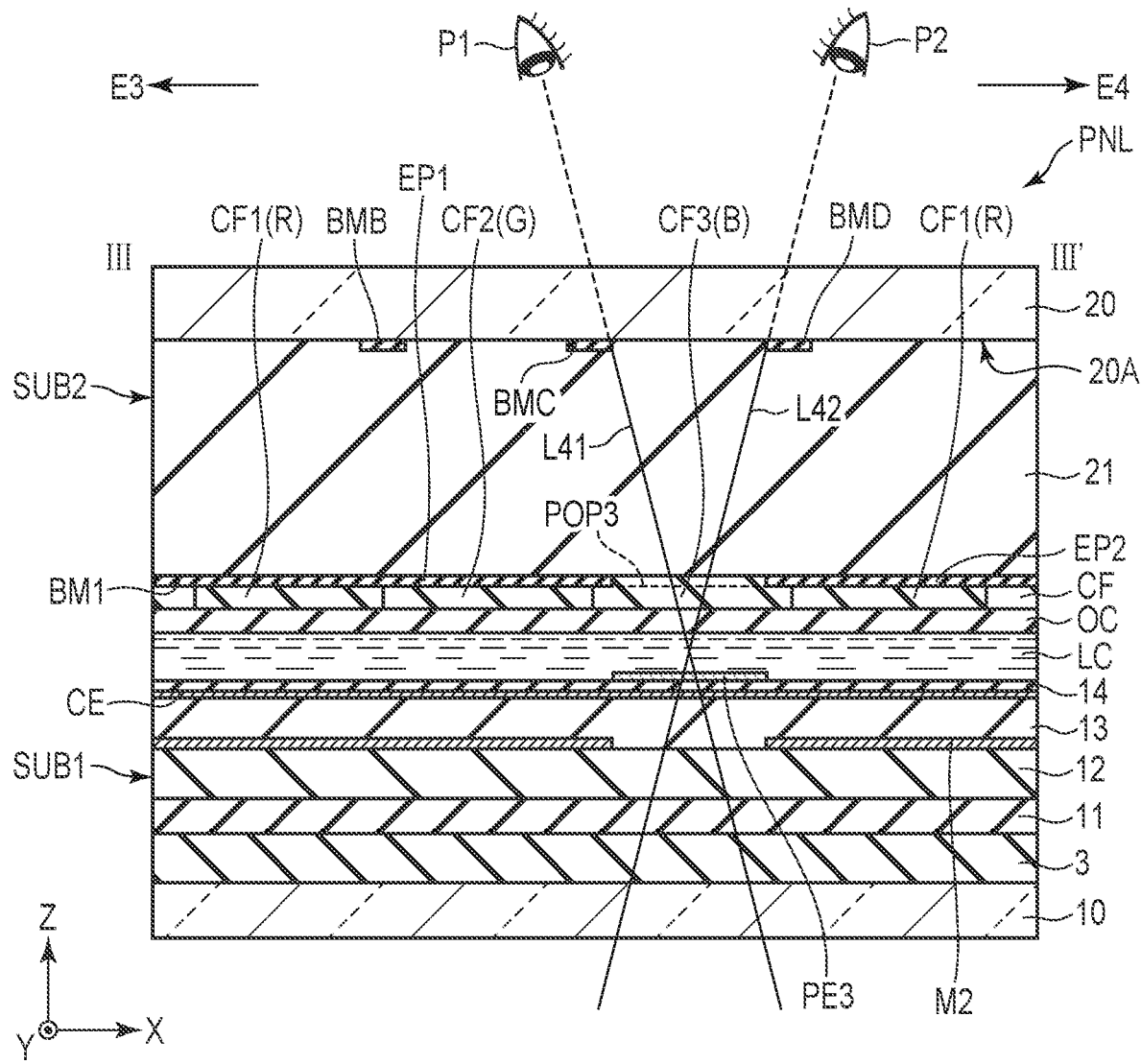
FIG. 14 is a cross-sectional view of the display panel taken along line III-III' shown in FIG. 13.

FIG. 14 is a cross-sectional view of the display panel PNL taken along line III-III' shown in FIG. 13.

A second substrate SUB2 includes the third light-shielding member BMC and the fourth light-shielding member BMD. The third light-shielding member BMC and the fourth light-shielding member BMD are located on the liquid crystal layer LC side of the insulating substrate 20. In the example illustrated, the third light-shielding member BMC and the fourth light-shielding member BMD are located on the surface 20A. The third light-shielding member BMC and the fourth light-shielding member BMD are formed of the same material as the material of the second light-shielding member BMB, and are formed of, for example, a resin colored in black. The organic insulating layer 21 covers the third light-shielding member BMC and the fourth light-shielding member BMD. In addition, the pixel electrode PE3 overlaps the third pixel opening POP3 between the first extended portion EP1 and the second extended portion EP2.

Next, the effects that can be obtained by the present embodiment will be described.

As illustrated in the third embodiment, when observing the display panel PNL from the observation point P1, the display light in which the red light and the green light are reduced is observed. For this reason, the display light observed from the observation point P1 has a larger proportion of blue light than the display light observed from the front. Incidentally, the observation from the front corresponds to the case of observing the display panel PNL in the third direction Z.

According to the fourth embodiment, the third light-shielding member BMC overlaps between a second color filter CF2 and a third color filter CF3. For this reason, when observing the display panel PNL from the observation point P1, light L41 transmitted through the blue (B) third color filter CF3 is blocked by the third light-shielding member BMC. The blue light L41 is also reduced to a reduction in the red light and the green light, and thus the balance of display colors can be adjusted. Accordingly, it is possible to reduce the coloring of the display light.

Similarly, as illustrated in the third embodiment, when observing the display panel PNL from the observation point P2, the display light in which the red light and the green light are reduced is observed. For this reason, the display light observed from the observation point P2 has a larger proportion of blue light than the display light observed from the front.

According to the fourth embodiment, the fourth light-shielding member BMD overlaps between the third color filter CF3 and a first color filter CF1. For this reason, when observing the display panel PNL from the observation point P2, the light L42 transmitted through the blue (B) third color filter CF3 is blocked by the fourth light-shielding member BMD. The blue light L42 is also reduced to a reduction in the red light and the green light, and thus the balance of display colors can be adjusted. Accordingly, it is possible to reduce the coloring of the display light.

In addition, the first extended portion EP1, the third pixel opening POP3, and the second extended portion EP2 are arranged in the first direction X. The third light-shielding member BMC overlaps the first extended portion EP1, and the fourth light-shielding member BMD overlaps the second extended portion EP2. The green (G) second color filter CF2 does not contribute to display at the position at which the second color filter CF2 overlaps the first extended portion EP1, and the red (R) first color filter CF1 displays does not contribute to display at the position at which the first color filter CF1 overlaps the second extended portion EP2. For this reason, the third light-shielding member BMC and the fourth light-shielding member BMD can block the light passing through blue (B) third color filter CF3 alone at the position at which the third light-shielding member BMC and the fourth light-shielding member BMD overlap the first extended portion EP1 and the second extended portion EP2. Accordingly, it is possible to reduce the blue light without excessively reducing the red light and the green light.

Figure 15:
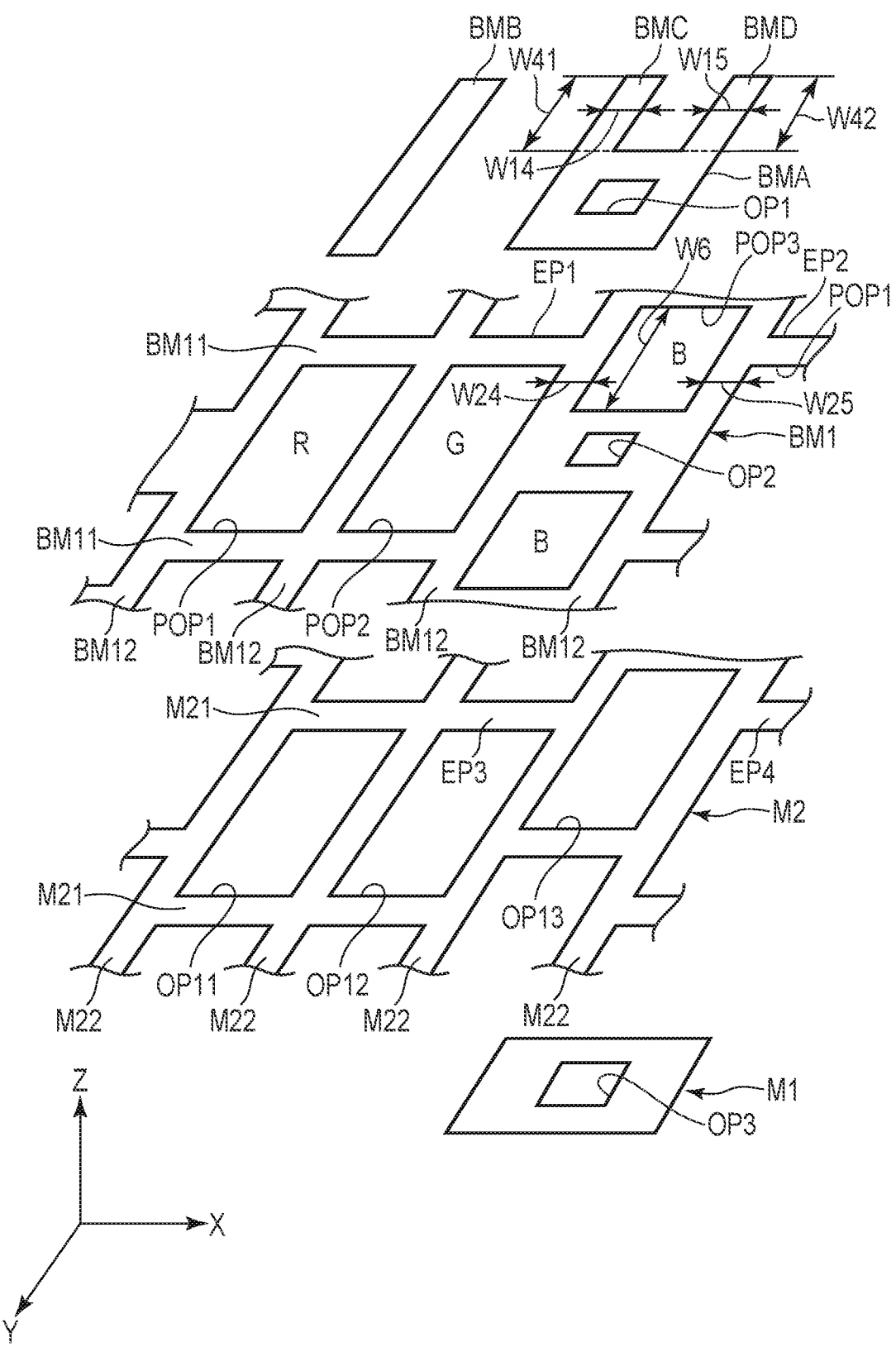
FIG. 15 is a perspective view illustrating the relationship between a first light-shielding member, a second light-shielding member, a third light-shielding member, a fourth light-shielding member, a light-shielding layer, a first metal layer, and a second metal layer according to a fourth embodiment.

FIG. 15 is a perspective view illustrating the relationship between the first light-shielding member BMA, the second light-shielding member BMB, the third light-shielding member BMC, the fourth light-shielding member BMD, the light-shielding layer BM1, the first metal layer M1, and the second metal layer M2 according to the fourth embodiment.

The third light-shielding member BMC has a width W14 in the first direction X. The fourth light-shielding member BMD has a width W15 in the first direction X. The light-shielding layer BM1 has a width W24 between the second pixel opening POP2 and the third pixel opening POP3, and a width W25 between the third pixel opening POP3 and the first pixel opening POP1. For example, the width W14 is equal to the width W24 and the width W15 is equal to the width W25.

In addition, the third light-shielding member BMC has a width W41 in the second direction Y. The fourth light-shielding member BMD has a width W42 in the second direction Y. The third pixel opening POP3 has a width W6 in the second direction Y. The widths W41 and W42 are smaller than the width W6.

The second metal layer M2 is different from the configuration illustrated in the third embodiment in that the position of the opening OP13 is shifted in the second direction Y to the openings OP11 and OP12. The first part M21 of the second metal layer M2 has a third extended portion EP3 and a fourth extended portion EP4 elongated in the first direction X. The third extended portion EP3, the opening OP13, and the fourth extended portion EP4 are arranged in the first direction X.

Next, a detailed configuration of an optical sensor SS, the pixel PX1, and the like will be described with reference to FIGS. 16 to 18.

Figure 16:
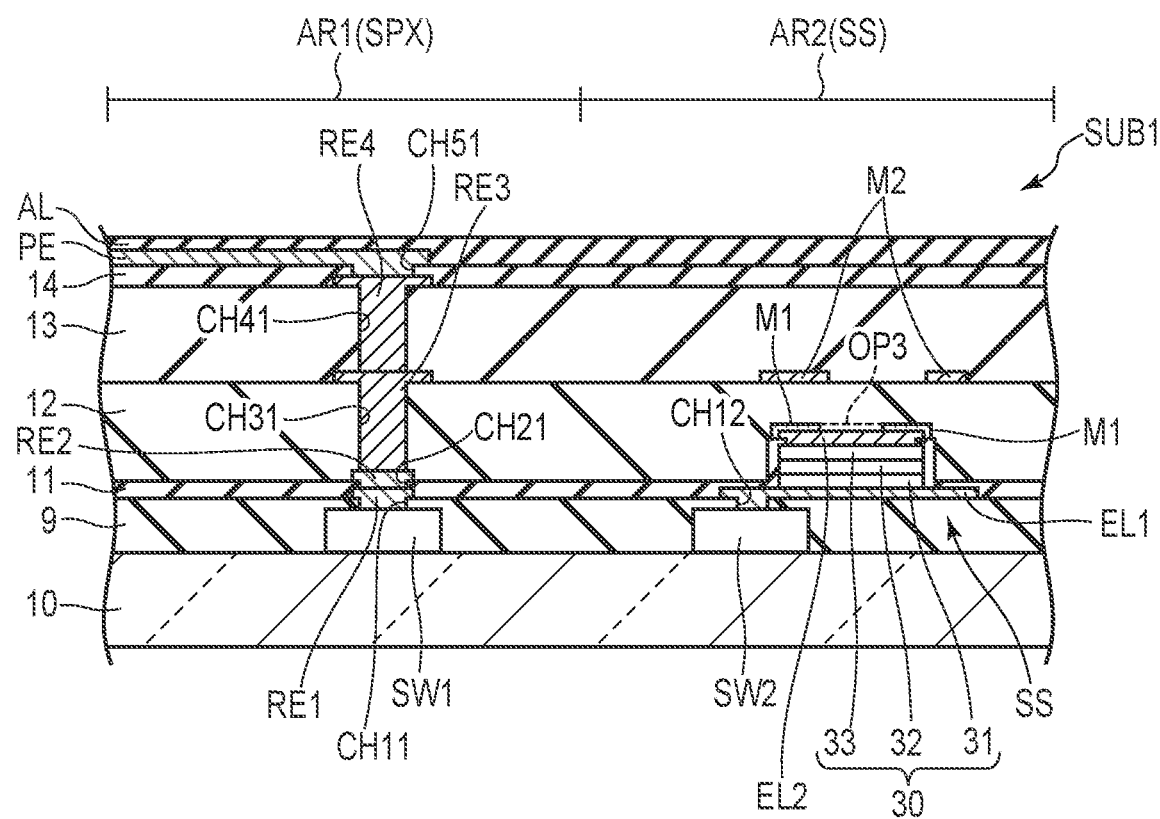
FIG. 16 is a cross-sectional view illustrating a detailed layer structure of a first substrate in a first area in which sub-pixels are located and in a second area in which an optical sensor is located.

FIG. 16 is a cross-sectional view illustrating a detailed layer structure of a first substrate SUB1 in a first area AR1 in which a sub-pixel SPX is located and in a second area AR2 in which the optical sensor SS is located.

First, the layer structure of the first area AR1 will be described.

A switching element SW1 is located on an insulating substrate 10. An insulating layer 9 covers the switching element SW1. A relay electrode RE1 is located on the insulating layer 9. The relay electrode RE1 is connected to the switching element SW1 through a contact hole CH11 formed in the insulating layer 9. An insulating layer 11 covers the relay electrode RE1. A relay electrode RE2 is located on the insulating layer 11. The relay electrode RE2 is connected to the relay electrode RE1 through a contact hole CH21 formed in the insulating layer 11.

An insulating layer 12 covers the relay electrode RE2. A relay electrode RE3 is located on the insulating layer 12. The relay electrode RE3 is connected to the relay electrode RE2 through a contact hole CH31 formed in the insulating layer 12. An insulating layer 13 covers the relay electrode RE3. A relay electrode RE4 is located on the insulating layer 13. The relay electrode RE4 is connected to the relay electrode RE3 through a contact hole CH41 formed in the insulating layer 13.

An insulating layer 14 covers the relay electrode RE4. The pixel electrode PE is located on the insulating layer 14. The pixel electrode PE is connected to the relay electrode RE4 through a contact hole CH51 formed in the insulating layer 14. An alignment film AL covers the pixel electrode PE and the insulating layer 14. Incidentally, the relay electrode RE4 and the above-mentioned common electrode CE are both located in the same layer between the insulating layer 13 and the insulating layer 14.

Next, the layer structure of the second area AR2 will be described.

A switching element SW2 is located on the insulating substrate 10. The insulating layer 9 covers the switching element SW2. The optical sensor SS includes a lower electrode EL1, a photoelectric conversion element 30 overlapping the lower electrode EL1, and an upper electrode (transparent electrode) EL2 overlapping the photoelectric conversion element 30. The lower electrode EL1 is located on the insulating layer 9. The lower electrode EL1 is connected to the switching element SW2 through a contact hole CH12 formed in the insulating layer 9. The lower electrode EL1 is made of an opaque metal material. That is, the lower electrode EL1 functions as a light-shielding layer for the photoelectric conversion element 30, and suppresses the entrance of the light transmitted through the insulating substrate 10 to the photoelectric conversion element 30. Incidentally, the lower electrode EL1 and the relay electrode RE1 are both located in the same layer between the insulating layer 9 and the insulating layer 11.

The photoelectric conversion element 30 is a photodiode, and outputs an electric signal according to the applied light. More specifically, the photoelectric conversion element 30 is a Positive Intrinsic Negative (PIN) photodiode.

The photoelectric conversion element 30 has a p-type semiconductor layer 31, an i-type semiconductor layer 32, and an n-type semiconductor layer 33. The p-type semiconductor layer 31, the i-type semiconductor layer 32, and the n-type semiconductor layer 33 are stacked in this order. Incidentally, the n-type semiconductor layer 33, the i-type semiconductor layer 32, and the p-type semiconductor layer 31 may be stacked in this order. The p-type semiconductor layer 31 is formed of, for example, polycrystalline silicon, and the i-type semiconductor layer 32 and the n-type semiconductor layer 33 are formed of, for example, amorphous silicon (a-Si). Incidentally, the material of the semiconductor layer is not limited to this, and amorphous silicon may be replaced with polycrystalline silicon, microcrystalline silicon, or the like, or polycrystalline silicon may be replaced with amorphous silicon, microcrystalline silicon, or the like.

The insulating layer 11 covers the lower electrode EL1 and the photoelectric conversion element 30. In the optical sensor SS, an upper electrode EL2 is located on the light receiving side and electrically connected to the n-type semiconductor layer 33. The upper electrode EL2 is a transparent electrode made of a transparent conductive material, for example, including ITO. The first metal layer M1 is disposed on the upper electrode EL2 and is in contact with the upper electrode EL2. The third opening OP3 of the first metal layer M1 is formed at a position at which the third opening OP3 overlaps the lower electrode EL1, the photoelectric conversion element 30, and the upper electrode EL2. The insulating layer 12 covers the first metal layer M1. The second metal layer M2 is located on the insulating layer 12. Incidentally, the first metal layer M1 and the relay electrode RE2 are both located in the same layer between the insulating layer 11 and the insulating layer 12. The second metal layer M2 and the relay electrode RE3 are both located in the same layer between the insulating layer 12 and the insulating layer 13. In addition, the switching elements SW1 and SW2, the insulating layer 9, and the like are included in the above-mentioned constituent layer 3.

FIG. 17 is a plan view illustrating the pixel PX1.

Source lines S11 to S14 extend in the second direction Y and are arranged in the first direction X. Source lines S21 to S24 extend in the second direction Y and are arranged in the first direction X. The source lines S21 to S24 overlap the source lines S11 to S14, respectively. Gate lines G1, G11, and G2 extend in the first direction X and are arranged in the second direction Y. Incidentally, the gate lines G1 and G2 overlap the first part BM11 of the light-shielding layer BM1 and the first part M21 of the second metal layer M2. In addition, the source lines S11 to S14 and the source lines S21 to S24 overlap a second part BM12 of the light-shielding layer BM1 and a second part M22 of the second metal layer M2 described above.

The first color filter CF1, the second color filter CF2, and the third color filter CF3 extend in the second direction Y and are arranged in the first direction X. The first color filter CF1 has end parts C1 and C2 elongated in the second direction Y. The second color filter CF2 has end parts C3 and C4 elongated in the second direction Y. The third color filter CF3 has end parts C5 and C6 elongated in the second direction Y. The end part C1 overlaps the source lines S11 and S21, the end parts C2 and C3 overlap the source lines S12 and S22, the end parts C4 and C5 overlap the source lines S13 and S23, and the end part C6 overlaps the source lines S14 and S24. Incidentally, the end parts C1 to C6 also overlap the second part BM12 of the light-shielding layer BM1 and the second part M22 of the second metal layer M2.

The third color filter CF3 is not disposed at a position overlapping the gate line G11. An infrared cut layer IRC is disposed at a position overlapping the gate line G11. In FIG. 17, the area in which the infrared cut layer IRC is disposed is indicated by diagonal lines. The infrared cut layer IRC is located between two third color filters CF3 arranged in the second direction Y.

Here, the configuration of the switching element SW1 of a sub-pixel SPX1 will be described. Incidentally, the configuration of the switching element SW1 of sub-pixels SPX2 and SPX3 is the same as that of the switching element SW1 of the sub-pixel SPX1.

The switching element SW1 includes gate electrodes GE1 and GE2 and a semiconductor layer SC1. A part of the semiconductor layer SC1 is disposed so as to overlap the source line S12, and the other part extends between the source lines S11 and S12 to form an approximately U shape. The semiconductor layer SC1 intersects the gate line G1 at a position at which the semiconductor layer SC1 overlaps the source line S12, and also intersects the gate line G1 between the source lines S11 and S12. In the gate line G1, the area overlapping the semiconductor layer SC1 functions as the gate electrodes GE1 and GE2, respectively. That is, the switching element SW1 in the illustrated example has a double-gate structure. In addition, the semiconductor layer SC1 is electrically connected to the source line S12 through the contact hole CH1 at one end part SCA, and is electrically connected to a drain electrode (not shown) through the contact hole CH2 at the other end part SCB.

Next, the configuration of the switching element SW2 connected to the optical sensor SS will be described.

The switching element SW2 includes gate electrodes GE3 and GE4 and a semiconductor layer SC2. A part of the semiconductor layer SC2 is disposed so as to overlap the source line S23, and the other part extends between the source lines S23 and S24 to form an approximately U shape. The semiconductor layer SC2 intersects the gate line C11 at two places between the source lines S23 and S24. In the gate line G11, the area overlapping the semiconductor layer SC2 functions as the gate electrodes GE3 and GE4, respectively. That is, the switching element SW2 in the illustrated example has a double-gate structure. In addition, the semiconductor layer SC2 is electrically connected to the source line S23 through the contact hole CH3 at one end part SCC, and is electrically connected to the lower electrode through the contact hole CH4 at the other end part SCD. The semiconductor layers SC1 and SC2 are formed of, for example, polycrystalline silicon.

Figure 18:
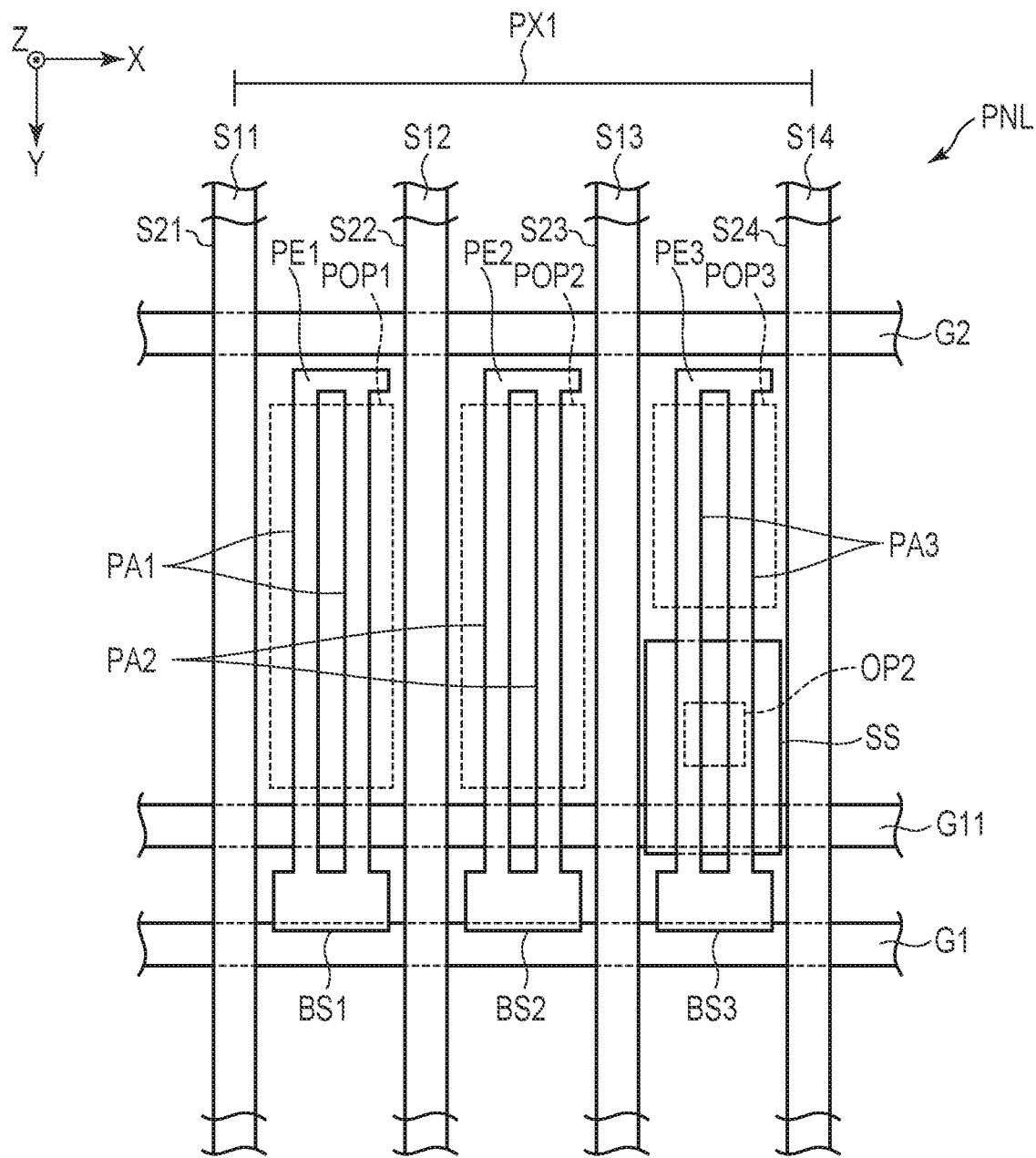
FIG. 18 is another plan view illustrating the pixels.

FIG. 18 is another plan view illustrating the pixel PX1.

The pixel electrodes PE1 to PE3 are arranged in the first direction X. The pixel electrode PE1 is located between the source line S11 and the source line S12. The pixel electrode PE2 is located between the source line S12 and the source line S13. The pixel electrode PE3 is located between the source line S13 and the source line S14. In addition, pixel electrodes PE1 to PE3 are located between the gate line G1 and the gate line G2. The gate line G11 overlaps the pixel electrodes PE1 to PE3.

The pixel electrodes PE1 to PE3 include bases BS1 to BS3 in a rectangular shape, respectively. The bases BS1 to BS3 are positioned between the gate line G1 and the gate line G11 in planar view. In addition, the pixel electrodes PE1 to PE3 include strip electrodes PA1 to PA3 elongated along the second direction Y, respectively. The strip electrodes PA1 to PA3 are connected to the bases BS1 to BS3, respectively. In the example illustrated, the number of strip electrodes PA1 to PA3 is two, but may be one or three or more.

The pixel electrode PE1 overlaps the first pixel opening POP1. The pixel electrode PE2 overlaps the second pixel opening POP2. The pixel electrode PE3 overlaps both the third pixel opening POP3 and the optical sensor SS.

In the example illustrated, the source lines S11 to S14 and S21 to S24, the pixel electrodes PE1 to PE3, and the like extend in parallel to the second direction Y, but may extend obliquely to the second direction Y.

As described above, according to the present embodiment, it is possible to obtain a display device capable of suppressing degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
  a first substrate including an optical sensor; a second substrate facing the first substrate; and a liquid crystal layer located between the first substrate and the second substrate, wherein
  the second substrate includes
  an insulating substrate,
  a first light-shielding member in a frame shape located on a side of the liquid crystal layer of the insulating substrate, the first light-shielding member having a first opening overlapping the optical sensor,
  a transparent organic insulating layer covering the first light-shielding member,
  a light-shielding layer disposed on a side of the liquid crystal layer of the organic insulating layer, the light-shielding layer having a second opening overlapping the first opening, and a first pixel opening and a second pixel opening,
  a first color filter disposed in the first pixel opening, and
  a second color filter disposed in the second pixel opening, the second color filter having a color different from a color of the first color filter, wherein the second opening is located between the first pixel opening and the second pixel opening in a first direction,
  the first light-shielding member has a first outer edge and a second outer edge elongated in a second direction intersecting the first direction,
  the first outer edge overlaps the light-shielding layer between the second opening and the first pixel opening in a planar view,
  the second outer edge overlaps the light-shielding layer between the second opening and the second pixel opening in a planar view,
  the first substrate includes a first metal layer in a frame shape disposed closer to the liquid crystal layer from the optical sensor, the first metal layer having a third opening overlapping the first opening and the second opening,
  the optical sensor includes a transparent electrode located on a light receiving side, and
  the first metal layer is in contact with the transparent electrode.

2. The display device according to claim 1, wherein
  the first outer edge does not overlap the first color filter, and
  the second outer edge does not overlap the second color filter.

3. The display device according to claim 1, further comprising an infrared cut layer disposed in the second opening.

4. The display device according to claim 1, wherein a width of the first opening along the first direction is equal to a width of the second opening along the first direction.

5. The display device according to claim 1, wherein
  the first metal layer has a third outer edge and a fourth outer edge elongated in the second direction,
  the third outer edge overlaps the light-shielding layer between the second opening and the first pixel opening in a planar view, and
  the fourth outer edge overlaps the light-shielding layer between the second opening and the second pixel opening in a planar view.

6. The display device according to claim 1, wherein a first thickness of the organic insulating layer is larger than a second thickness between a lower surface of the first metal layer and a lower surface of the organic insulating layer.

7. The display device according to claim 1, wherein
  the first substrate includes a second metal layer located close to the liquid crystal layer from the first metal layer, and
  the second metal layer has a fourth opening between the second opening and the third opening.

8. A display device comprising: a first substrate including an optical sensor; a second substrate facing the first substrate; and a liquid crystal layer located between the first substrate and the second substrate, wherein
  the second substrate includes
  an insulating substrate,
  a first light-shielding member in a frame shape located on a side of the liquid crystal layer of the insulating substrate, the first light-shielding member having a first opening overlapping the optical sensor,
  a second light-shielding member in a strip shape located on a side of the liquid crystal layer of the insulating substrate,
  a transparent organic insulating layer covering the first light-shielding member and the second light-shielding member, a light-shielding layer disposed on a side of the liquid crystal layer of the organic insulating layer, the light-shielding layer having a second opening overlapping the first opening, and a first pixel opening and a second pixel opening, a first color filter disposed in the first pixel opening, and a second color filter disposed in the second pixel opening, the second color filter having a color different from a color of the first color filter, wherein the first light-shielding member and the second light-shielding member are disposed in a first direction, the second pixel opening is located between the first pixel opening and the second opening in the first direction, and the second light-shielding member is located between the first pixel opening and the second pixel opening in a planar view.

9. The display device according to claim 8, wherein a width of the second light-shielding member is smaller than a width of the first pixel opening in a second direction intersecting the first direction.

10. The display device according to claim 8, wherein the light-shielding layer further includes a third pixel opening arranged next to the second opening in a second direction intersecting the first direction, and a first extended portion and a second extended portion elongated in the first direction, the first extended portion, the third pixel opening, and the second extended portion are arranged in the first direction, the second substrate includes a third light-shielding member in a strip shape and a fourth light-shielding member in a strip shape located on a side of the liquid crystal layer of the insulating substrate, the third light-shielding member overlaps the first extended portion, and the fourth light-shielding member overlaps the second extended portion.

11. The display device according to claim 8, wherein the first substrate includes a first metal layer in a frame shape disposed close to the liquid crystal layer from the optical sensor, the first metal layer having a third opening overlapping the first opening and the second opening, the optical sensor includes a transparent electrode located on a light receiving side, and the first metal layer is in contact with the transparent electrode.

12. The display device according to claim 11, wherein a first thickness of the organic insulating layer is larger than a second thickness between a lower surface of the first metal layer and a lower surface of the organic insulating layer.

13. The display device according to claim 11, wherein the first substrate includes a second metal layer located close to the liquid crystal layer from the first metal layer, and the second metal layer has a fourth opening between the second opening and the third opening.

* * * * *